(12) United States Patent
Matsui et al.

(10) Patent No.: US 11,018,332 B2
(45) Date of Patent: May 25, 2021

(54) LITHIUM SECONDARY BATTERY INCLUDING LITHIUM METAL AS NEGATIVE ELECTRODE ACTIVE MATERIAL

(71) Applicant: Panasonic Intellectual Property Management Co., Ltd., Osaka (JP)

(72) Inventors: Tooru Matsui, Osaka (JP); Junichi Sakamoto, Osaka (JP); Kazuko Asano, Osaka (JP); Akira Kano, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 61 days.

(21) Appl. No.: 15/963,992

(22) Filed: Apr. 26, 2018

(65) Prior Publication Data
US 2018/0337395 A1 Nov. 22, 2018

(30) Foreign Application Priority Data

May 18, 2017 (JP) .............................. JP2017-099260

(51) Int. Cl.
*H01M 4/134* (2010.01)
*H01M 4/04* (2006.01)
(Continued)

(52) U.S. Cl.
CPC ......... *H01M 4/134* (2013.01); *H01M 4/0404* (2013.01); *H01M 4/131* (2013.01);
(Continued)

(58) Field of Classification Search
None
See application file for complete search history.

(56) References Cited

U.S. PATENT DOCUMENTS

| 2006/0110661 A1 | 5/2006 | Lee et al. |
| 2006/0115723 A1 | 6/2006 | Ando et al. |
| (Continued) | | |

FOREIGN PATENT DOCUMENTS

| JP | 2-042367 | 2/1990 |
| JP | 2001-243957 | 9/2001 |
| (Continued) | | |

OTHER PUBLICATIONS

The Extended European Search Report dated Oct. 15, 2018 for the related European Patent Application No. 18172010.3.

*Primary Examiner* — Daniel S Gatewood
(74) *Attorney, Agent, or Firm* — McDermott Will and Emery LLP

(57) ABSTRACT

A lithium secondary battery includes: a positive electrode; a negative electrode including a negative electrode collector having a surface, on which a lithium metal is deposited during charge; a separator disposed between the positive electrode and the negative electrode; and a nonaqueous electrolyte solution filled between the positive electrode and the negative electrode. The negative electrode collector includes projection portions projecting from the surface toward the separator. There is no projection portion on an imaginary line extending from a first end to a second end opposite to the first end of the surface of the negative electrode collector and traversing a space between the projection portions.

25 Claims, 14 Drawing Sheets

(51) Int. Cl.
- *H01M 4/46* (2006.01)
- *H01M 4/1395* (2010.01)
- *H01M 4/1391* (2010.01)
- *H01M 4/62* (2006.01)
- *H01M 10/0525* (2010.01)
- *H01M 4/131* (2010.01)
- *H01M 4/70* (2006.01)
- *H01M 4/66* (2006.01)
- *H01M 10/052* (2010.01)
- *H01M 4/02* (2006.01)

(52) U.S. Cl.
CPC ....... *H01M 4/1391* (2013.01); *H01M 4/1395* (2013.01); *H01M 4/463* (2013.01); *H01M 4/62* (2013.01); *H01M 4/66* (2013.01); *H01M 4/70* (2013.01); *H01M 10/052* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2007/0190421 A1* | 8/2007 | Sato | C01G 51/42 429/231.3 |
| 2010/0209784 A1* | 8/2010 | Yamazaki | H01M 4/139 429/338 |
| 2011/0020536 A1 | 1/2011 | Yamamoto et al. | |
| 2013/0122362 A1 | 5/2013 | Sato et al. | |
| 2014/0099539 A1* | 4/2014 | Yamazaki | H01M 4/386 429/211 |
| 2014/0304982 A1 | 10/2014 | Morishima et al. | |
| 2015/0280212 A1 | 10/2015 | Son et al. | |

FOREIGN PATENT DOCUMENTS

| | | |
|---|---|---|
| JP | 2006-156351 | 6/2006 |
| JP | 2010-092878 | 4/2010 |
| JP | 2010-219030 | 9/2010 |
| JP | 2016-527680 | 9/2016 |
| WO | 2004/059760 | 7/2004 |
| WO | 2012/014780 | 2/2012 |
| WO | 2013/098970 | 7/2013 |

* cited by examiner

LITHIUM SECONDARY BATTERY INCLUDING LITHIUM METAL AS NEGATIVE ELECTRODE ACTIVE MATERIAL

BACKGROUND

1. Technical Field

The present disclosure relates to a lithium secondary battery including a lithium metal as a negative electrode active material.

2. Description of the Related Art

A lithium metal has an electrical capacity of 2,062 mAh/$cm^3$ and has been expected as a negative electrode active material of a secondary battery having a high energy density. When a lithium metal is used as a negative electrode active material, the lithium metal is deposited on a negative electrode collector during charge and is then dissolved during discharge. In the case described above, because of uneven deposition of the lithium metal on the negative electrode collector, a dissolution efficiency (that is, charge/discharge efficiency) of the lithium metal is decreased. In addition, the lithium metal has a low density (0.534 $g/cm^3$). Hence, by the deposition and dissolution of the lithium metal on the negative electrode collector, the volume of the negative electrode is remarkably changed. Accordingly, the change in volume of a secondary battery using a lithium metal is also increased.

In order to suppress uneven deposition of a lithium metal and to improve the charge/discharge efficiency, Japanese Unexamined Patent Application Publication No. 2001-243957 has proposed the use of a flat negative electrode collector. According to this patent document, when a negative electrode collector having a ten-point average roughness of 10 μm or less is used, the charge/discharge efficiency is improved.

In order to absorb the change in volume of the negative electrode, Japanese Unexamined Patent Application Publication No. 2006-156351 has proposed the use of a negative electrode collector having a plurality of recesses each having, for example, a diameter of 1 μm to 3 cm and a depth of 0.1 to 300 μm. In addition, Japanese Unexamined Patent Application Publication (Translation of PCT Application) No. 2016-527680 has proposed the use of a porous negative electrode collector formed from copper or nickel having, for example, a porosity of 50% to 99% and a pore size of 5 to 500 μm.

SUMMARY

In one general aspect, the techniques disclosed here feature a lithium secondary battery comprising: a positive electrode including a positive electrode active material containing lithium; a negative electrode including a negative electrode collector having a surface, on which a lithium metal is deposited in a charged state; a separator disposed between the positive electrode and the negative electrode; and a nonaqueous electrolyte solution which is filled between the positive electrode and the negative electrode and which has a lithium ion conductivity. The negative electrode collector includes projection portions projecting from the surface toward the separator. There is no projection portion on an imaginary line extending from a first end to a second end opposite to the first end of the surface of the negative electrode collector and traversing a space between the projection portions.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
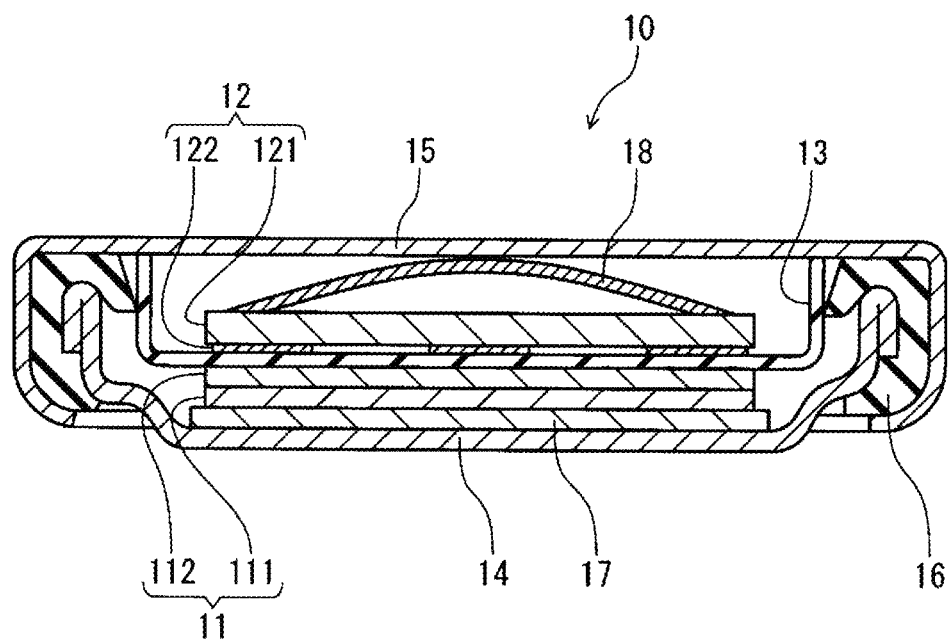
FIG. 1 is a cross-sectional view schematically showing a lithium secondary battery according to an embodiment.

A lithium secondary battery of this embodiment comprises: a positive electrode; a negative electrode facing the positive electrode; a separator disposed between the positive electrode and the negative electrode; and a nonaqueous electrolyte solution having a lithium ion conductivity. The negative electrode includes a negative electrode collector. The negative electrode collector has a facing surface facing the positive electrode. The facing surface of the negative electrode collector includes a base portion and at least one projection portion projecting from the base portion.

Since the projection portion is arranged on the facing surface of the negative electrode collector facing the positive electrode, a space is formed between the facing surface and the separator. During charge, a lithium metal is primarily deposited on the facing surface facing this space, that is, on the base portion of the facing surface. That is, since a lithium metal is deposited so as to be received in the space described above, the change in apparent volume of the negative electrode is suppressed.

The base portion is disposed so as to extend to at least a part of the periphery of the negative electrode collector. That is, the periphery of the negative electrode collector is not surrounded by the projection portion. Hence, a lithium metal to be deposited on the base portion can be easily brought into contact with the separator without being disturbed by the projection portion. Accordingly, the solubility of a lithium metal during discharge is improved, and a decrease in charge/discharge efficiency is suppressed. The periphery of the negative electrode collector is an outermost portion of the negative electrode collector and may also include the periphery of the facing surface.

The base portion may include a continuous region (hereinafter, referred to as "open region") in which peripheral portions of the negative electrode collector facing each other extend to each other. In other words, at least a part of the base portion may continuously extend from an arbitrary point of the periphery of the negative electrode collector to another point of the periphery thereof located at a point symmetry position with respect to the center of the negative electrode collector (facing surface) or to another point of the periphery thereof located at a line symmetry position with respect to a central line passing through the center of the facing surface. Accordingly, since the contact property between a lithium metal to be deposited and the separator is further improved, and in addition, since the electrolyte solution is able to flow (travel) on the negative electrode collector, the distribution of the electrolyte solution on the negative electrode collector becomes uniform. Hence, a lithium metal is likely to be uniformly deposited on the base portion, and even when charge/discharge is repeatedly performed, a high charge/discharge efficiency is likely to be maintained. In addition, the separator is also in contact with the surface of the projection portion and presses the surface thereof. Hence, a lithium metal is not likely to be deposited on the surface of the projection portion.

Although being not particularly limited, the shape and the arrangement of the projection portion are determined so that the base portion extends to at least a part of the periphery of the negative electrode collector. Accordingly, the separator is likely to be brought into contact with a lithium metal to be deposited on the base portion.

The area of the base portion with respect to the area of the facing surface may be 30% to 99.8%, 70% to 98%, or 80% to 98%. When the area (the area of a contact portion between the projection portion and the facing surface; and when the number of the projection portions is at least two, the area is the total area thereof) of the projection portion on the facing surface is 0.2% or more of the area of the facing surface, the separator is likely to be supported by the projection portion, and as a result, the distance between the facing surface and the separator is likely to be maintained constant. In addition, the area of the open region may be 85% to 100%, 90% to 100%, or 95% to 100% of the area of the base portion.

As the shape of the projection portion viewed along the normal line direction of the facing surface, for example, a line shape or a spot shape may be mentioned. The spot shape indicates, for example, a polygonal shape or a round shape (including an oval shape). The line shape may be a straight line, a curved line, or a combination of a straight line and a curved line. When the shape of the projection portion is a line shape, the starting point and the ending point thereof may not coincide with each other. Since the contact property of a lithium metal to be deposited and the separator is likely to be improved, the shape of the projection portion may be either a spot shape or a round shape.

In addition, a cross-sectional shape of the projection portion along the normal line direction of the facing surface may be a taper shape in which the width thereof is increased toward the facing surface. Accordingly, a lithium metal deposited on the base portion located around the projection portion is more likely to be brought into contact with the separator. In order to reduce the damage to the separator, the taper shape described above may have a flat top portion and two side portions so that the distance therebetween is increased from the top portion to the facing surface. In this case, when edges of the top portion are rounded (chamfered), the damage to the separator caused by the projection portion is further likely to be reduced. The distance between the two side portions may be rapidly changed in the vicinity of the top portion to form a steep slope, and on the other hand, in the vicinity of the facing surface, the two side portions each may be gradually curved so as to form a tail extending toward the outside of the projection portion.

When the above cross-section of the projection portion has a taper shape having a flat top portion and two side portions, the diameter of the top portion may be 70 µm or more. Accordingly, the damage to the separator caused by the projection portion is further reduced. The diameter of the top portion is the minimum diameter of the top portion in the cross-section. When the top portion of the cross-section is inclined, the length of a straight line drawn from one end of the top portion close to the facing surface to the side portion opposite thereto in parallel to the facing surface is regarded as the diameter of the top portion.

The height of the projection portion may be appropriately set so as to form a space in which a lithium metal to be deposited can be received. In addition, since the separator has a compressive property, the height of the projection portion may be slightly lower than the height of the lithium metal to be deposited on the base portion during charge. However, when the height of the projection portion is excessively lower than the height of the lithium metal to be deposited, the change in apparent volume of the negative electrode is increased. On the other hand, when the height of the projection portion is excessively higher than the height of the lithium metal to be deposited, since the contact property between the separator and the lithium metal to be deposited is degraded, and the charge/discharge efficiency may be decreased in some cases. The height of the projection portion is, for example, 80% to 300% of the height of the lithium metal to be deposited on the base portion during charge. In addition, the amount of the lithium metal to be deposited depends on the electrical capacity of the positive electrode. For example, when the electrical capacity of the positive electrode is 4 to 8 mAh/cm$^2$, the height of the projection portion may be set to 15 to 120 µm.

As described later, when the base portion and the projection portion are integrally formed, the height of the projection portion is defined as described below. After the negative electrode is placed on a horizontal plane, the cross-section thereof is viewed, and the minimum distance between a horizontal straight line passing through the lowest point of a recess portion and a horizontal straight line passing through the highest point of the projection portion is regarded as the height of the projection portion.

The number of the projection portions is not particularly limited, and the number thereof may be either one or at least two. When the number of the projection portions is at least two, the shapes and/or the sizes of the projection portions may be either the same or different from each other.

When the number of the projection portions is at least two, a minimum distance D between the projection portions may be either 0.1 mm or more or 1 mm or more. Accordingly, since the separator is likely to intrude between the projection portions, the lithium metal deposited on the base portion is likely to be brought into contact with the separator. Furthermore, the electrolyte solution is allowed to smoothly flow on the base portion. On the other hand, since the distance between the facing surface and the separator is likely to be maintained constant, and an appropriate space is likely to be maintained, the minimum distance D between the projection portions may be 9 mm or less. The minimum distance D is the minimum distance between the peripheries (when the projection portions each have a flat top portion, the peripheries of the top portions) of the projection portions when the projection portions are viewed along the normal line direction of the facing surface. When the number of the projection portions is at least three, the average minimum distance among the peripheries of the projection portions is regarded as the minimum distance D.

When two positive electrodes are disposed so as to face two surfaces of the negative electrode, the projection portions are arranged on two primary surfaces of the negative electrode.

The projection portion may be formed, for example, of a first electrically conductive material other than a lithium metal and a lithium alloy or an insulating material.

The first electrically conductive material is not allowed to react with a lithium metal, that is, may not form an alloy or an intermetallic compound with a lithium metal. The reason for this is to suppress the expansion of an apparent volume of the negative electrode. As the first electrically conductive material described above, for example, a metal material, such as stainless steel, nickel, copper, or iron, may be mentioned. Since the projection portion is easily formed, and the mechanical strength is superior, the first electrically conductive material may be copper or stainless steel.

A method for forming the projection portion using the first electrically conductive material is not particularly limited. For example, a foil-shaped first electrically conductive material may be etched. By the method described above, the base portion and the projection portion are integrally formed. In this case, etching is performed so the etched surface is smoothed. In addition, on the foil-shaped first electrically conductive material thus etched, another electrically conductive material may be further laminated. In addition, the projection portion may be formed in such a way that a foil-shaped or a line-shaped first electrically conductive material is cut to have desired shape and length and is then bonded to the facing surface by welding (such as ultrasonic welding or resistance welding) or the like. The projection portion formed using the first electrically conductive material may function as a part of the negative electrode collector.

On the other hand, the insulating material is not particularly limited, and for example, besides a polyolefin (such as a polyethylene or a polypropylene), there may be mentioned resin materials, such as so-called engineering plastics including a polyimide, a poly(phenylene ether), a polyester (such as a poly(ethylene terephthalate)), and a poly(ether ether ketone). Since the chemical stability against a non-aqueous electrolyte solution is superior, and the projection portion is easily formed, the insulating material may be a polyimide.

A method for forming the projection portion using the insulating material is not particularly limited. For example, a tape-shaped insulating material provided with an adhesive (such as a silicone resin or an acrylic resin) may be cut into a desired shape and then adhered to the facing surface. In addition, a sheet-shaped or a line-shaped (such as a thread-shaped) insulating material may be cut to have desired shape and length and then thermal-fused to the facing surface. Alternatively, after a precursor of the insulating material is applied on the facing surface to have a desired shape, the precursor thus applied may be polymerized, cross-linked, or re-cross-linked by a heat treatment or the like. When a polyimide is used as the insulating material, for example, after a poly(amic acid) solution which is a precursor of a polyimide is pattern-printed on the facing surface, the precursor may be imidized by a heat treatment.

When the projection portion is formed using the insulating material, an area of the facing surface on which a lithium metal can be deposited is decreased. However, a lithium metal deposited on a smooth base portion is to be effectively used during discharge. Hence, the charge/discharge efficiency is likely to be improved.

Since those two methods are each able to use a negative electrode collector which has been generally used in a lithium secondary battery field, the cost can be reduced. In addition, since the electrically conductive or the insulating projection portion can be formed by a significantly simple method, the productivity is improved.

(Negative Electrode)

The negative electrode includes a negative electrode collector on which a lithium metal is deposited during charge.

The negative electrode collector is formed, for example, of a second electrically conductive material other than a lithium metal and a lithium alloy. The second electrically conductive material may also be a material which is not allowed to react with a lithium metal (when being a metal, the electrically conductive material forms no alloy nor intermetallic compound with a lithium metal). As the second electrically conductive material described above, there may be mentioned a material similar to the first electrically conductive material or graphite in which basal surfaces are preferentially exposed. In view of the strength, the second electrically conductive material may be copper or stainless steel. In addition, the first electrically conductive material and the second electrically conductive material may be either the same or different from each other.

The base portion of the negative electrode collector may also be smooth. Accordingly, during charge, a lithium metal derived from the positive electrodes is likely to be uniformly deposited on the base portion. The "smooth" described above indicates that a maximum height roughness Rz of the facing surface is 20 µm or less. The maximum height roughness Rz of the facing surface may also be 10 µm or less. The maximum height roughness Rz is measured in accordance with JIS B 0601: 2013. As the negative electrode collector described above, foil of the metal material mentioned above, a graphite sheet, or the like may be mentioned.

The thickness of the negative electrode collector is not particularly limited and may be, for example, 5 to 300 μm.

On the facing surface of the negative electrode collector, besides the projection portion, a negative electrode active material layer containing a lithium metal may also be formed. Accordingly, the charge/discharge efficiency is likely to be improved. The negative electrode active material layer may be formed over the entire facing surface. The negative electrode active material layer is formed, for example, by electrodeposition or deposition of a lithium metal. The order of formation of the negative electrode active material layer and the projection portion is not particularly limited, after the negative electrode active material layer is formed, the projection portion may be formed, or after the projection portion is formed, the negative electrode active material layer may be formed. The thickness of the negative electrode active material layer is also not particularly limited and may be, for example, 30 to 300 μm.

(Positive Electrode)

The positive electrode is obtained, for example, by forming a disc shape from a positive electrode mixture which is a mixture of a positive electrode active material, an electrically conductive material, and a binder. Alternatively, the positive electrode is obtained by holding a layer (positive electrode mixture layer) containing the positive electrode mixture on a positive electrode collector. As the positive electrode collector, for example, stainless steel, aluminum, or titanium may be used. The positive electrode mixture layer may be held on the positive electrode collector in such a way that a slurry formed by mixing the positive electrode mixture and a liquid component is applied on the surface of the positive electrode collector and is then dried. The thickness of the positive electrode collector is not particularly limited and may be, for example, 5 to 300 μm. The thickness of the positive electrode mixture layer is also not particularly limited and may be, for example, 30 to 300 μm.

As long as being capable of occluding and releasing lithium, the positive electrode active material is not particularly limited. As the positive electrode active material, for example, there may be mentioned a lithium-manganese composite oxide (such as $LiMn_2O_4$), a lithium-nickel composite oxide (such as $LiNiO_2$), a lithium-cobalt composite oxide (such as $LiCoO_2$), a lithium-iron composite oxide (such as $LiFeO_2$), a lithium-nickel-cobalt-manganese composite oxide (such as $LiNi_{0.5}Co_{0.2}Mn_{0.3}O_2$, $LiNi_{1/3}Co_{1/3}Mn_{1/3}O_2$, or $LiNi_{0.4}Co_{0.2}Mn_{0.4}O_2$), a lithium-nickel-cobalt-aluminum composite oxide (such as $LiNi_{0.8}Co_{0.15}Al_{0.05}O_2$, or $LiNi_{0.8}Co_{0.18}Al_{0.02}O_2$), a lithium-nickel-manganese composite oxide (such as $LiNi_{0.5}Mn_{0.5}O_2$), a lithium-nickel-cobalt composite oxide (such as $LiNi_{0.8}Co_{0.2}O_2$), a lithium-transition metal phosphoric acid compound (such as $LiFePO_4$), or a lithium-transition metal sulfuric acid compound (such as $Li_xFe_2(SO_4)_3$). Since the energy density is likely to be increased, as the positive electrode active material, a lithium-cobalt composite oxide, a lithium-nickel-cobalt-manganese composite oxide, or a lithium-nickel-cobalt-aluminum composite oxide may be used.

As the electrically conductive material, for example, there may be mentioned natural graphite, man-made graphite, carbon black, or carbon fibers. As the carbon black, for example, there may be mentioned acetylene black, Ketjen black, channel black, furnace black, lamp black, or thermal black. Those materials may be used alone, or at least two types thereof may be used in combination. The amount of the electrically conductive material contained in the positive electrode mixture with respect to 100 parts by mass of the positive electrode active material is, for example, 5 to 30 parts by mass.

As the binder, for example, there may be mentioned an olefin resin, such as a polyethylene or a polypropylene; a fluorine-containing resin, such as a polytetrafluoroethylene (PTFE), a poly(vinylidene fluoride), a tetrafluoroethylene-hexafluoropropylene copolymer, or a vinylidene fluoride-hexafluoropropylene copolymer; a styrene-butadiene rubber, a fluorine-containing rubber, or a poly(meth)acrylic acid. Those compounds may be used alone, or at least two types thereof may be used in combination. The amount of the binder contained in the positive electrode mixture with respect to 100 parts by mass of the positive electrode active material is, for example, 3 to 15 parts by mass.

(Separator)

As the separator, for example, there may be mentioned a porous film containing a polyolefin, a three-dimensional regular array porous film containing a polyimide, or a non-woven cloth formed from a material similar to that mentioned above. In addition, the separator may also be a sheet formed by fixing fine particles of an inorganic compound, such as aluminum oxide, with a binder. Those compounds may be used alone, or at least two types thereof may be used in combination. The thickness of the separator is not particularly limited and is, for example, 5 to 200 μm.

(Nonaqueous Electrolyte Solution)

As the nonaqueous electrolyte solution, a known material which has a lithium ion conductivity and which has been used for a lithium secondary battery may be mentioned by way of example. The nonaqueous electrolyte solution contains, for example, an electrolyte salt and a nonaqueous solvent.

As the electrolyte salt, for example, there may be mentioned $LiPF_6$, $LiBF_4$, $LiN(SO_2F)_2$, $LiN(SO_2CF_3)_2$, or $LiBF_2(C_2O_4)$.

Although the nonaqueous solvent is not particularly limited, for example, there may be mentioned a cyclic carbonate, a chain carbonate, a cyclic carboxylic acid ester, a cyclic sulfone, a cyclic ether, or a chain ether. As the cyclic carbonate, for example, there may be mentioned propylene carbonate or ethylene carbonate (EC). As the chain carbonate, for example, there may be mentioned diethyl carbonate, ethyl methyl carbonate (EMC), or dimethyl carbonate (DMC). As the cyclic carboxylic acid ester, for example, there may be mentioned γ-butyrolactone or γ-valerolactone. As the cyclic sulfone, for example, there may be mentioned sulfolane or methylsulfolane. As the cyclic ether, for example, there may be mentioned 1,3-dioxolane. As the chain ether, for example, there may be mentioned 1,2-dimethoxyethane or 1,2-diethoxyethane.

Since the charge/discharge efficiency is improved, the nonaqueous solvent may also be a fluorine-containing cyclic carbonate. As the fluorine-containing cyclic carbonate, for example, there may be mentioned fluoroethylene carbonate (FEC), difluoroethylene carbonate, or trifluoroethylene carbonate. Since the distribution of the electrolyte solution on the negative electrode collector is likely to become uniform, the nonaqueous solvent may be a chain carbonate and may be DMC and/or EMC.

In particular, the nonaqueous solvent may also be a mixed solvent containing a fluorine-containing cyclic carbonate and a chain carbonate. The electrolyte solution contains, for example, a nonaqueous solvent, such as FEC or FEC further mixed with DMC, and an electrolyte salt, such as $LiPF_6$ or $LiN(SO_2F)_2$. In this case, FEC and DMC may be mixed together so as to satisfy FEC/DMC=0.1/0.9 to 1/0 (molar ratio). LiPF$_6$ or LiN(SO$_2$F)$_2$ may be dissolved so as to satisfy electrolyte salt/nonaqueous solvent=1/2 to 1/20 (molar ratio).

FIG. 1 is a cross-sectional view schematically showing a coin-type lithium secondary battery according to this embodiment. However, the shape of the lithium secondary battery is not limited thereto. Depending on the application of the battery, besides the coin type, the shape of the lithium secondary battery may be appropriately selected from various shapes, such as a cylindrical type, a square type, a sheet type, a flat type, and a laminate type.

A coin-type lithium secondary battery 10 includes a positive electrode 11, a negative electrode 12, and a separator 13 disposed therebetween. In addition, the positive electrode 11, the negative electrode 12, and the separator 13 are in contact with a nonaqueous electrolyte not shown in the figure.

A positive electrode case 14 is a member receiving the positive electrode 11 and the separator 13 and also functions as a positive electrode collector and a positive electrode terminal. The positive electrode case 14 also functions as a sealing plate of the coin-type battery. As a material forming the positive electrode case 14, various materials known in the lithium secondary battery field may be mentioned. In particular, for example, titanium or stainless steel may be mentioned.

The positive electrode 11 includes a positive electrode collector 111 and a positive electrode mixture layer 112. The positive electrode mixture layer 112 faces the separator 13. The positive electrode collector 111 faces the positive electrode case 14 with an electrically conductive spacer 17 interposed therebetween. In addition, the positive electrode collector 111 is electrically connected to the positive electrode case 14 with the spacer 17 interposed therebetween. A material of the spacer 17 is not particularly limited as long as having an electrical conductivity, and for example, a material similar to that of the positive electrode case 14 may be mentioned.

A negative electrode case 15 is a member which is electrically connected to the negative electrode 12 and which functions as a negative electrode terminal. As a material forming the negative electrode case 15, various materials known in the lithium secondary battery field may be mentioned. In particular, for example, iron, titanium, or stainless steel may be mentioned.

The negative electrode 12 includes a negative electrode collector 121, and on a facing surface 12X (for example, see FIG. 2) facing the positive electrode 11, projection portions 122 are arranged. Between the negative electrode case 15 and the negative electrode 12, a disc spring 18 is disposed. The negative electrode 12 is pressed toward a positive electrode 11 side by the disc spring 18. In addition, the negative electrode 12 is electrically connected to the negative electrode case 15 with the disc spring 18 interposed therebetween. A material of the disc spring 18 is not particularly limited as long as having an electrical conductivity, and for example, a material similar to that of the negative electrode case 15 may be mentioned.

Between the positive electrode case 14 and the negative electrode case 15, a gasket 16 is disposed. By the presence of the gasket 16, the positive electrode case 14 and the negative electrode case 15 are insulated from each other. As a material forming the gasket 16, for example, a synthetic resin, such as a polypropylene, a poly(phenylene sulfide), or a poly(ether ether ketone), may be mentioned. A material forming the gasket 16 may be a polypropylene.

Hereinafter, with reference to the drawings, variations of the projection portion to be arranged on the negative electrode collector will be described. FIGS. 2 to 8 are each a top view schematically showing a negative electrode according to one of the following embodiments. In each embodiment, the entire area of the base portion is an open region. However, the shape of the projection portion and the arrangement thereof are not limited to those shown in each embodiment. In addition, for the convenience of illustration, in the example shown in each figure, the base portion is hatched, and the flow of the electrolyte solution is partially shown by an arrow F.

First Embodiment

Figure 2:
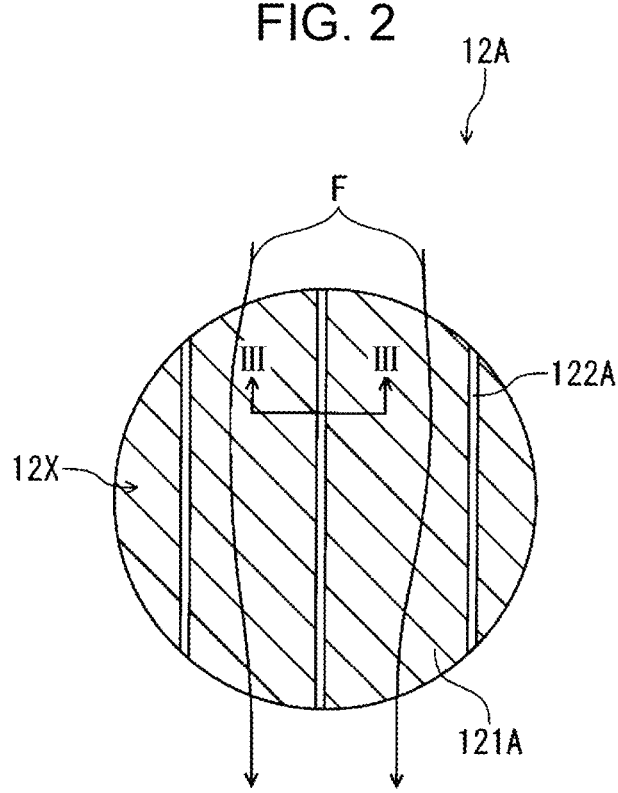
FIG. 2 is a top view schematically showing a negative electrode according to a first embodiment.

A negative electrode 12A of a first embodiment includes, as shown in FIG. 2, a round negative electrode collector 121A. On a facing-surface side of the negative electrode collector 121A, electrically conductive projection portions 122A are provided. The projection portions 122A each have a line shape. The negative electrode 12A as described above is used, for example, for a coin-type lithium secondary battery.

The projection portions 122A each may be a straight line as shown in the figure by way of example or may include a curved line. However, the projection portions 122A each may not be required to have a loop shape in which the starting point coincides with the ending point. In addition, the widths of the projection portion 122A in a short-side direction and a long-side direction each may be either constant or not constant.

Figure 3:
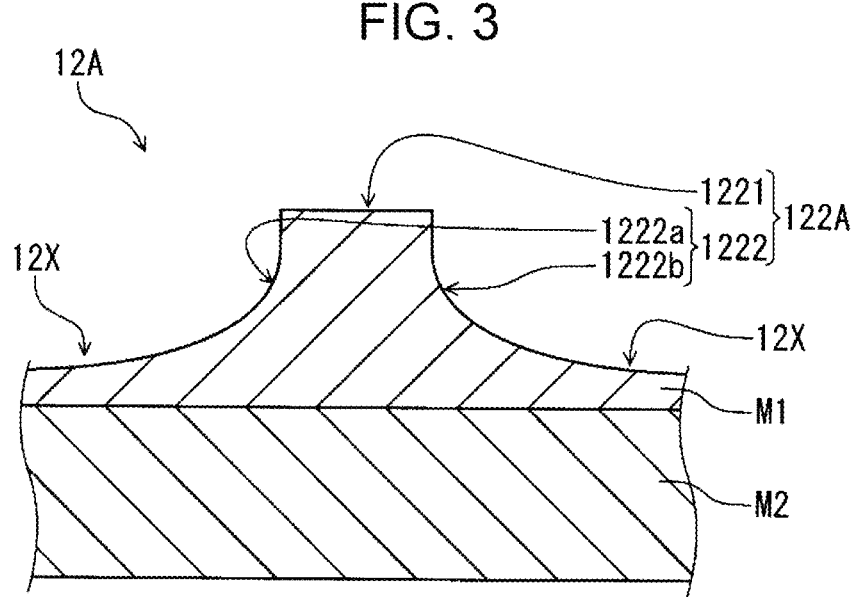
FIG. 3 is an enlarged cross-sectional view showing the negative electrode according to the first embodiment taken in a thickness direction along the line III-III of FIG. 2.

As shown in FIG. 3, a cross-section of the projection portion 122A along the normal line direction of the facing surface 12X includes a flat top portion 1221 and two side portions 1222 (1222a and 1222b), the distance therebetween being increased from the top portion 1221 to the facing surface 12X. The two side portions 1222 each have a rapid slope in the vicinity of the top portion 1221 and are each gradually curved in the vicinity of the facing surface 12X so as to form a tail extending toward the outside of the projection portion 122A. FIG. 3 is an enlarged cross-sectional view of the negative electrode 12A in a thickness direction thereof taken along the line III-III of FIG. 2.

The projection portions 122A as described above are formed by etching of metal foil M1 (such as copper foil). Hence, the base portion and the projection portions 122A are integrally formed. In addition, the projection portions 122A may be formed by bonding metal wires to a negative electrode collector (such as metal foil including stainless steel foil) by welding or the like.

The negative electrode 12A may also be a laminate of the above etched metal foil M1 and another metal foil M2. In this case, the metal foil M1 including the projection portions 122A and the metal foil M2 are able to function as the negative electrode collector 121A. The metal foil M1 and the metal foil M2 are bonded to each other, for example, by resistance welding.

At least one projection portion 122A is arranged. A plurality of the projection portions 122A may also be arranged. Accordingly, the distance between the facing surface 12X and the separator 13 is likely to be maintained constant, and the space formed therebetween is likely to be maintained. The number of the projection portions 122A to be arranged is not particularly limited, and the area of the base portion may be set to 30% to 99.8% of the area of the facing surface 12X.

The projection portions 122A are arranged so that a minimum distance D between the projection portions 122A is increased. Accordingly, the uniformity of current distribution viewed from the positive electrode can be maintained. In addition, the projection portions 122A may be arranged either in a line symmetrical manner with respect to a center line passing through the center of the facing surface 12X or in a point symmetrical manner with respect to the center of the facing surface 12X. Accordingly, the distance between the facing surface 12X and the separator 13 is likely to be maintained constant. The projection portions 122A may be arranged not to be parallel to each other but are arranged not to be interested to each other.

In the example shown in the figure, the diameter of the top portion 1221 of the projection portion 122A is 70 μm, the height thereof is 70 μm, and the minimum distance D between the projection portions 122A is approximately 5 mm. When adjacent projection portions 122A are not in parallel to each other, the minimum distance D therebetween is the minimum distance between an arbitrary point of one projection portion 122A and an arbitrary point of the other projection portion 122A on the facing surface 12X (hereinafter, the minimum distance D is defined as described above). In addition, the projection portions 122A are arranged on a facing surface 12X having a diameter of 15 mm.

Second Embodiment

Figure 4A:
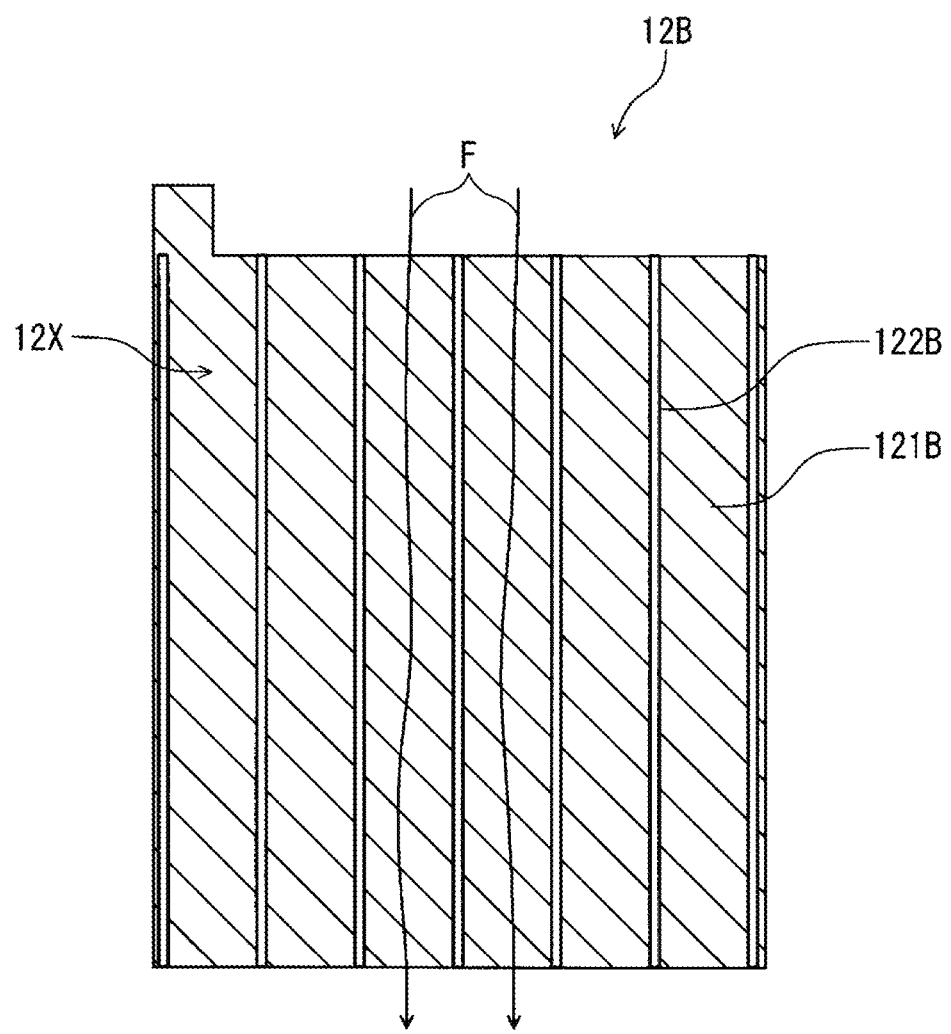
FIG. 4A is a top view schematically showing a negative electrode according to a second embodiment.
Figure 4B:
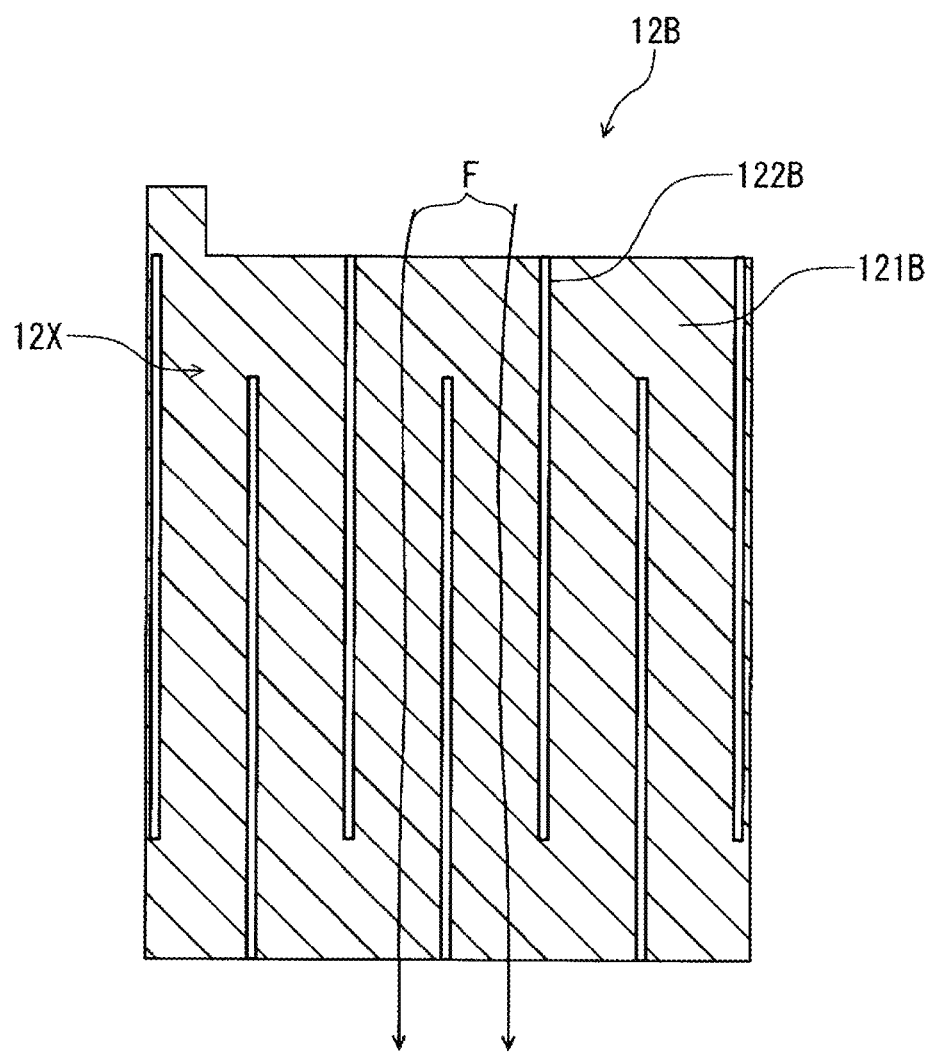
FIG. 4B is a top view schematically showing another negative electrode according to the second embodiment.
Figure 4C:
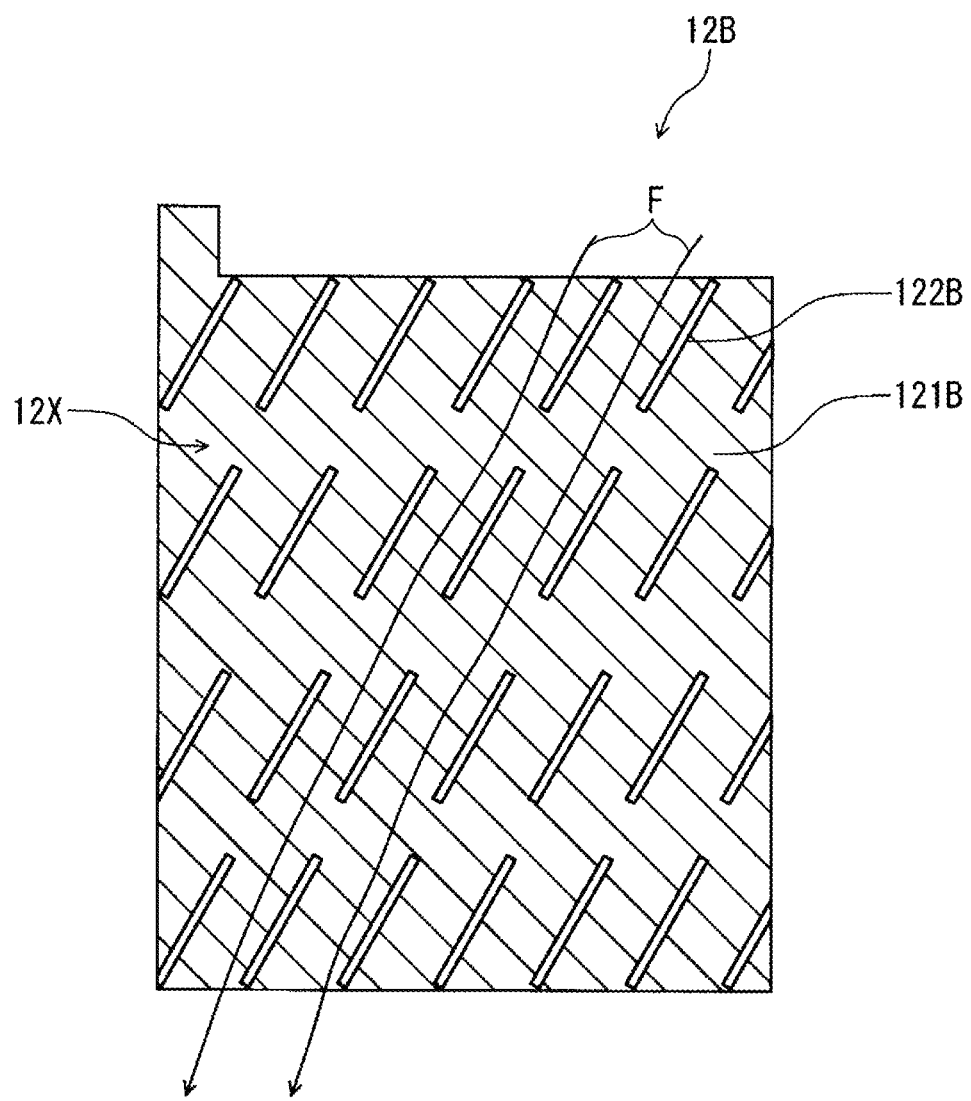
FIG. 4C is a top view schematically showing still another negative electrode according to the second embodiment.

As shown in FIGS. 4A to 4C, except for that a negative electrode 12B of a second embodiment includes a rectangular negative electrode collector 121B and that electrically conductive projection portions 122B are provided on a facing-surface side of the negative electrode collector 121B, the negative electrode 12B of the second embodiment is similar to the negative electrode 12A of the first embodiment. The projection portions 122B each have a line shape. The negative electrode 12B as described above is used, for example, for a sheet-type or a laminate-type lithium secondary battery.

The projection portions 122B may be arranged over the entire facing surface 12X at regular intervals. As shown in FIGS. 4A and 4B, the projection portions 122B are arranged along one side of the negative electrode collector 121B at regular intervals. Alternatively, for example, as shown in FIG. 4C, the projection portions 122B are arranged at regular intervals along a direction so as to intersect one side of the negative electrode collector 121B at an angle of less than 90°. The length of the line-shaped projection portion 122B in a long-side direction is, for example, 20% to 120% of the length of the long side of the facing surface 12X.

The number of the projection portions 122B to be arranged is not particularly limited and may be set so that the area of the base portion is 30% to 99.8% of the area of the facing surface 12X.

When two positive electrodes 11 are disposed to face two surfaces of the negative electrode 12B, the projection portions 122B are arranged on two primary surfaces of the negative electrode 12B.

Third Embodiment

Figure 5:
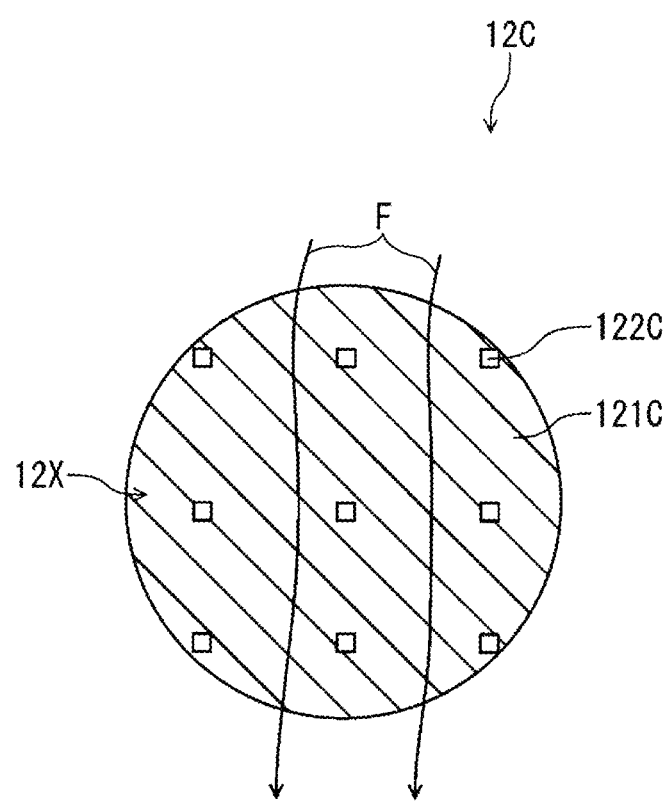
FIG. 5 is a top view schematically showing a negative electrode according to a third embodiment.

As shown in FIG. 5, except for that a negative electrode 12C of a third embodiment includes a round negative electrode collector 121C and that electrically conductive projection portions 122C are provided on a facing-surface side of the negative electrode collector 121C, the negative electrode 12C of the third embodiment is similar to the negative electrode 12A of the first embodiment. The projection portions 122C each have a polygonal (tetragonal) shape. The negative electrode 12C as described above is used, for example, for a coin-type lithium secondary battery.

A cross-section of the projection portion 122C along the normal line direction of the facing surface 12X includes a flat top portion and two side portions, the distance therebetween being increased from the top portion to the facing surface 12X. The projection portions 122C as described above are each formed by etching of metal foil. In this case, the base portion and the projection portions 122C are integrally formed. In addition, the projection portions 122c each may be formed by fixing a metal mesh having approximately 500 meshes per unit length to metal foil by resistance welding or the like.

An external form of the projection portion 122C is not particularly limited and may be, for example, a round shape. The shapes and the sizes of the projection portions 122C may be either the same or different from each other.

At least three projection portions 122C may be arranged. The reason for this is that the distance between the facing surface 12X and the separator 13 is likely to be maintained constant, and the space formed therebetween is likely to be maintained. Although the upper limit of the number of the projection portions 122C to be arranged is not particularly limited, the area of the base portion may be set to 30% to 99.8% of the area of the facing surface 12X.

The projection portions 122C are arranged so that the minimum distance D between the projection portions 122C is increased. Accordingly, the uniformity of current distribution viewed from the positive electrode can be maintained. In addition, the projection portions 122C may be arranged either in a line symmetrical manner with respect to a center line passing through the center of the facing surface 12X or in a point symmetrical manner with respect to the center of the facing surface 12X. Accordingly, the distance between the facing surface 12X and the separator 13 is likely to be maintained constant. When three projection portions 122C are arranged, the projection portions 122C are arranged in the vicinity of the periphery of the facing surface 12X at regular intervals. In the case described above, the three projection portions 122C form apexes of a regular triangle. When five projection portions 122C are arranged, one projection portion is arranged at the center of the facing surface 12X, and the remaining four projection portions are arranged in the vicinity of the periphery of the facing surface 12X at regular intervals. When one projection portion 122C is only arranged, the projection portion 122C may be arranged at the center of the facing surface 12X.

In the example shown in the figure, nine projection portions 122C are arranged. Among the nine projection portions 122C, one projection portion 122C is arranged at the center of the facing surface 12X, and the remaining eight projection portions 122C are arranged in the vicinity of the periphery of the facing surface 12X at regular intervals. The diameter of the top portion of the projection portion 122C is 70 μm, the height thereof is 30 μm, and the minimum distance D between the projection portions 122C is approximately 5 mm. In addition, the projection portions 122C are arranged on a facing surface 12X having a diameter of 15 mm.

Fourth Embodiment

Figure 6A:
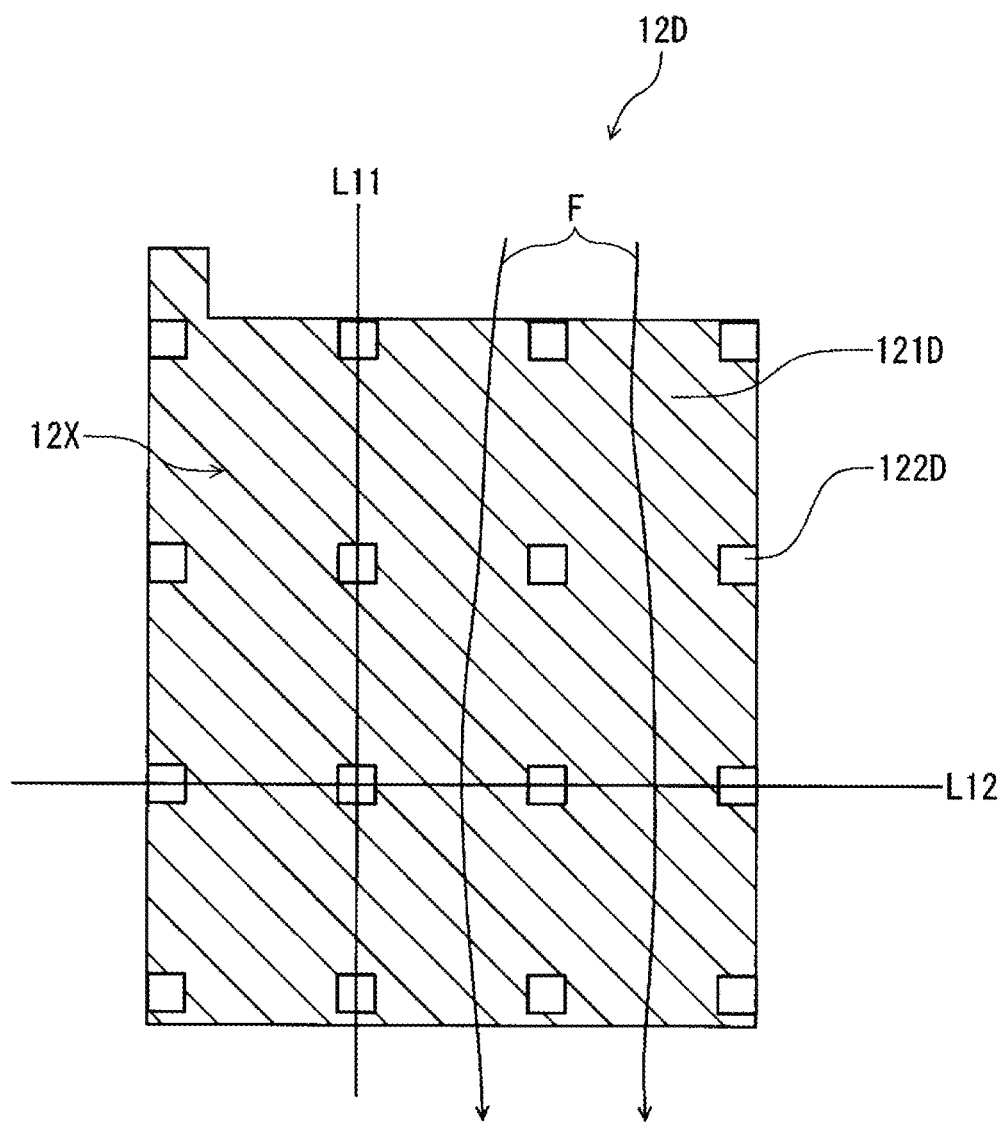
FIG. 6A is a top view schematically showing a negative electrode according to a fourth embodiment.
Figure 6B:
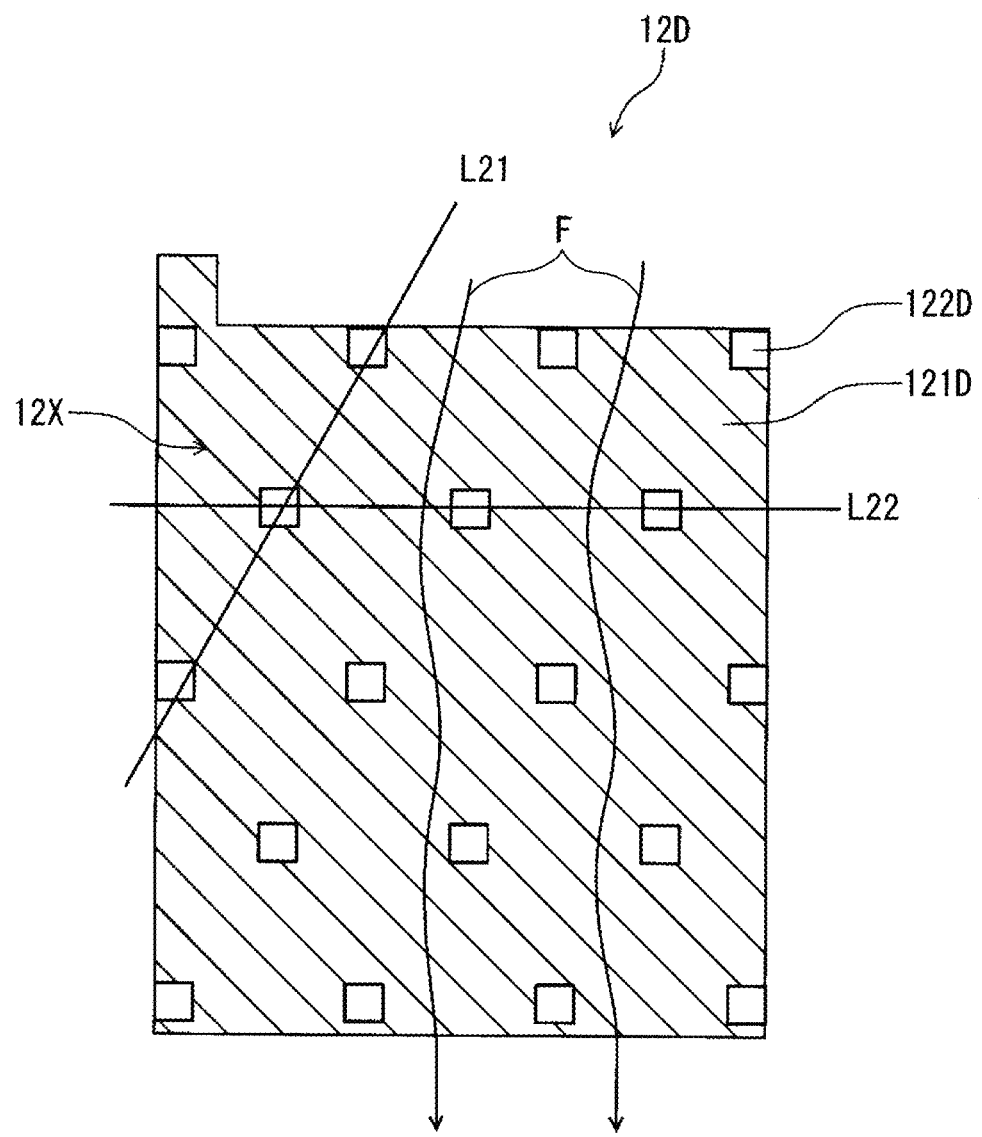
FIG. 6B is a top view schematically showing another negative electrode according to the fourth embodiment.

As shown in FIGS. 6A and 6B, except for that a negative electrode 12D of a fourth embodiment includes an approximately rectangular negative electrode collector 121D and that electrically conductive projection portions 122D are provided on a facing-surface side of the negative electrode collector 121D, the negative electrode 12D of the fourth embodiment is similar to the negative electrode 12C of the third embodiment. The projection portions 122D each have a polygonal (tetragonal) shape. The negative electrode 12D as described above is used, for example, for a sheet-type or a laminate-type lithium secondary battery.

The projection portions 122D may be arranged over the entire facing surface 12X at regular intervals. As shown in FIG. 6A, for example, the projection portions 122D are arranged at regular intervals along lines L11 and L12 which interest each other at an angle of 90°. As shown in FIG. 6B, for example, the projection portions 122D are arranged at regular intervals along lines L21 and L22 which intersect with each other at an angle of less than 90°.

Although the number of the projection portions 122D to be arranged is not particularly limited, the area of the base portion may be set to 30% to 99.8% of the area of the facing surface 12X.

When two positive electrodes 11 are disposed so as to face two surfaces of the negative electrode 12D, the projection portions 122D are arranged on two primary surfaces of the negative electrode 12D.

Fifth Embodiment

Figure 7:
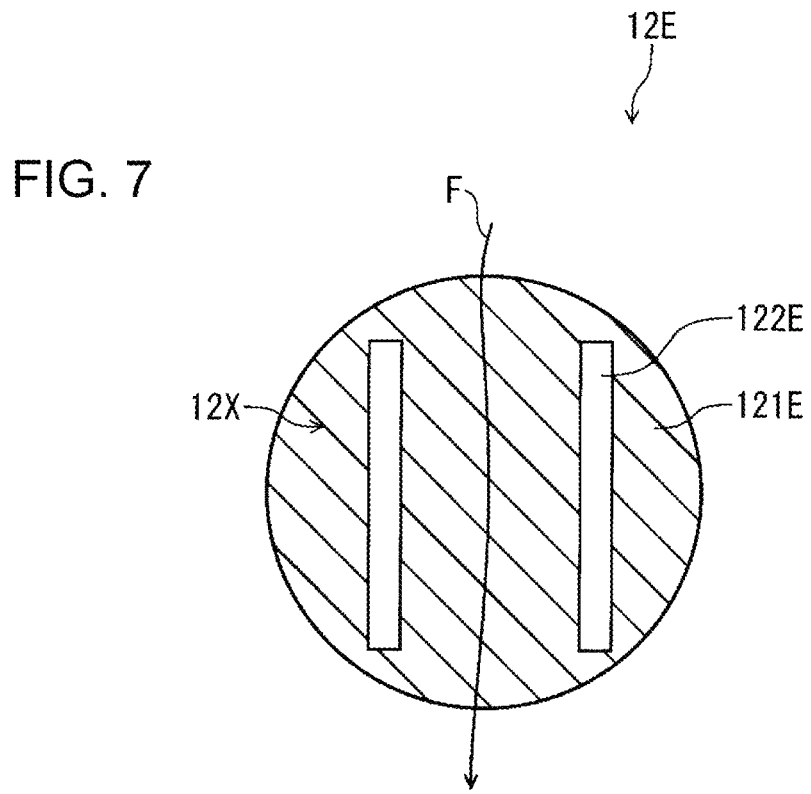
FIG. 7 is a top view schematically showing a negative electrode according to a fifth embodiment.

As shown in FIG. 7, a negative electrode 12E of a fifth embodiment includes a round negative electrode collector 121E. On a facing-surface side of the negative electrode collector 121E, insulating projection portions 122E are provided. The projection portions 122E each have a line shape. The negative electrode 12E as described above is used, for example, for a coin-type lithium secondary battery.

The projection portions 122E as described above are each formed, for example, by adhering a tape-shaped insulating material (such as a polyimide tape) to the facing surface 12X.

In the example shown in the figure, the length of the projection portion 122E in a short-side direction is 1 mm, the height thereof is 60 µm, and the minimum distance D between the two projection portions 122E is approximately 7 mm. The projection portions 122E are arranged on a facing surface 12X having a diameter of 15 mm.

Sixth Embodiment

Figure 8:
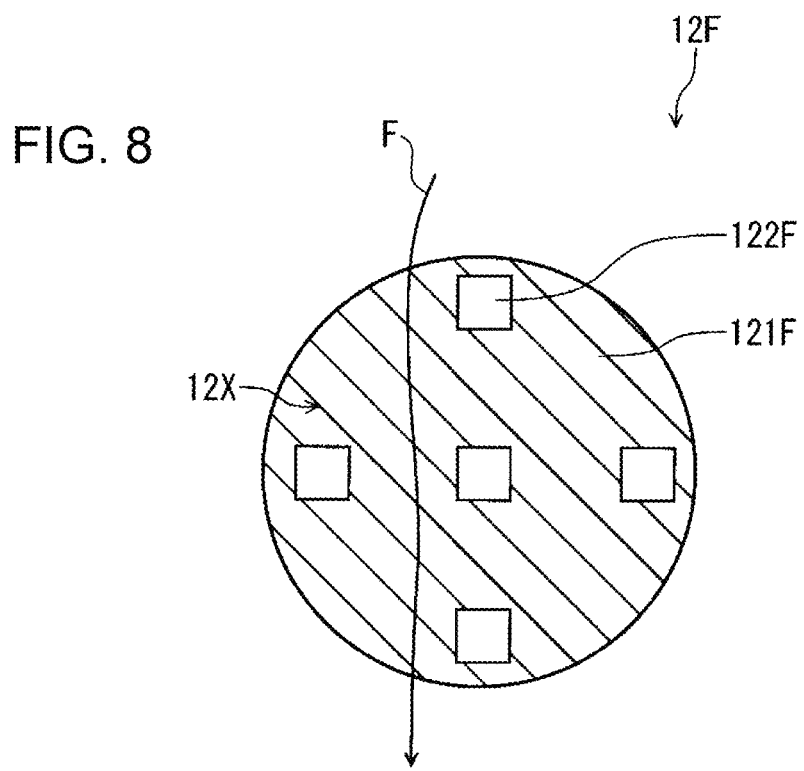
FIG. 8 is a top view schematically showing a negative electrode according to a sixth embodiment.

As shown in FIG. 8, except for that a negative electrode 12F of a sixth embodiment includes a round negative electrode collector 121F and that insulating projection portions 122F are provided on a facing-surface side of the negative electrode collector 121F, the negative electrode 12F of the sixth embodiment is similar to the negative electrode 12E of the fifth embodiment. However, the projection portion 122F has a polygonal (tetragonal) shape. The negative electrode 12F as described above is used, for example, for a coin-type lithium secondary battery.

In the example shown in the figure, the diameter of the projection portion 122F is 2 mm, the height thereof is 60 µm, and the minimum distance D between the projection portions 122F is approximately 6 mm. The projection portions are arranged on a facing surface 12X having a diameter of 15 mm.

Hereinafter, various examples will be described in detail. However, the present disclosure is not limited to the following examples.

Example 1

(1) Formation of Negative Electrode

By etching of stainless steel foil M1 (thickness: 100 µm, manufactured by Taiyo Wire Cloth Co., Ltd.), three line-shaped projection portions arranged similar to those shown in FIG. 2 and a base portion were integrally formed. The width (diameter) of a top portion of the projection portion was 70 µm, the height thereof was 30 µm, and the minimum distance D between the projection portions was approximately 5 mm. The area of the base portion was 95% of the area of the facing surface, and the entire area of the base portion of the negative electrode collector was an open region. The stainless steel foil thus etched was punched out into a disc having a diameter of 15 mm and then resistance-welded to one primary surface of another stainless steel foil M2 (maximum height roughness Rz: approximately 10 µm, manufactured by Hirai Seimitsu Kogyo Corporation) having a diameter of 15 mm and a thickness of 300 µm. As described above, a negative electrode including line-shaped projection portions was obtained. In addition, the maximum height roughness Rz of the base portion was 10 µm.

(2) Formation of Coin-Type Lithium Secondary Battery (Half Cell)

Figure 9:
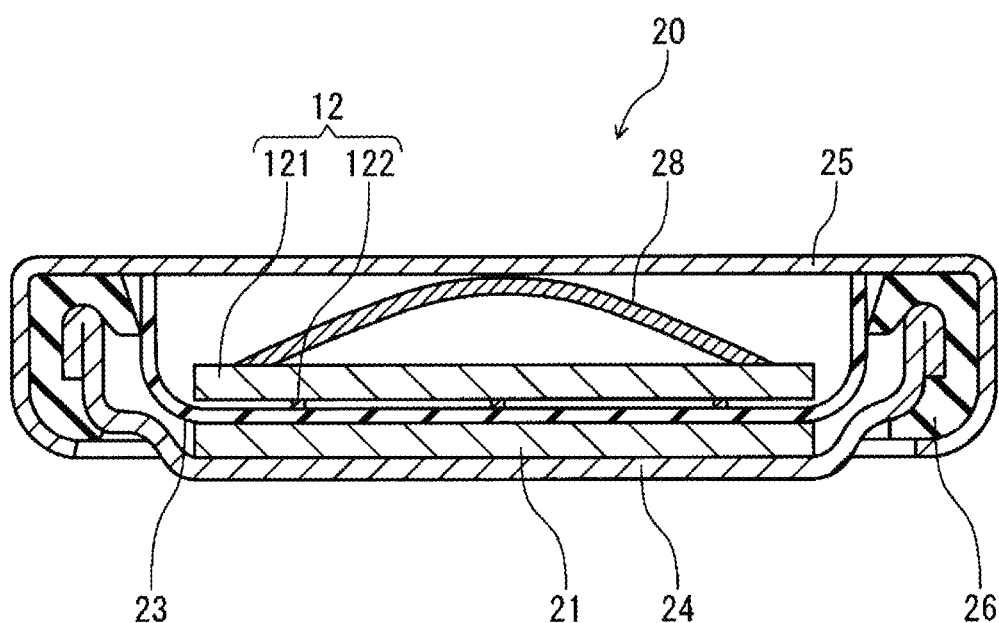
FIG. 9 is a cross-sectional view schematically showing a half cell formed in Example 1.

As described below, a half cell 20 (diameter: 20 mm, thickness: 1.6 mm) shown in FIG. 9 was assembled. In addition, (1) the formation of the negative electrode and (2) the formation of the half cell were performed in dry air at a dew point of approximately −60° C.

After lithium metal foil (diameter: 15 mm, thickness: 300 µm) used as a counter electrode 21 was adhered to a cap 24 (formed of stainless steel), 40 µL of an electrolyte solution containing $LiPF_6$/FEC/DMC=1/5/5 (molar ratio) was dripped. Subsequently, a separator 23 (polyimide resin-made three-dimensional regular array porous film, diameter: 17.6 mm) was disposed on the counter electrode 21, and furthermore, 40 µL of the electrolyte solution described above was dripped. After the negative electrode 12 obtained in the (1) was disposed on the above film, a disc spring 28 (formed of stainless steel) and a negative electrode case 25 (formed of stainless steel) were placed. Finally, the negative electrode case 25 was swaged over the cap 24 with a gasket 26 interposed therebetween for sealing, so that the half cell 20 was obtained.

In addition, $LiPF_6$ of the electrolyte solution was manufactured by Stella Chemifa Corporation, FEC was manufactured by Kishida Chemical Co., Ltd., and DMC was manufactured by Mitsubishi Chemical Corporation. The disc spring 28 was manufactured by Tokuhatsu Co., Ltd., and the cap 24, the case 25, and the gasket 26 were manufactured by PT PANASONIC GOBEL INDONESIA.

[Evaluation 1]

By the use of the half cell, a charge/discharge efficiency at 25° C. with respect to the negative electrode collector was obtained. Charge was performed at a current density of 3.75 mA/cm$^2$ for a charge time of 2 hours, and discharge was performed at a current density of 3.75 mA/cm$^2$. The current density was calculated based on the area (1.77 cm$^2$) obtained when the negative electrode was viewed along the normal line direction of the facing surface of the negative electrode collector. The discharge was finished when the voltage of the half cell reached 1 V or the discharge was performed for 2 hours. Under the conditions as described above, the charge/discharge cycle was repeatedly performed 10 times. The results are shown in Table 1.

Example 2

Except for that nine polygonal projection portions as shown in FIG. 5 were integrally formed together with a base portion by etching of stainless steel foil M1, a negative electrode and a half cell were formed in a manner similar to that of Example 1 and were then evaluated. The results are shown in Table 1. In addition, the top portion of the projection portion had a regular tetragonal shape having a side length of 70 μm, the height thereof is 30 μm, and the minimum distance D between the projection portions was approximately 5 mm. The area of the base portion is 99.5% of the area of the facing surface, and the entire area of the base portion of the negative electrode collector was an open region. The maximum height roughness Rz of the base portion was 10 μm.

Comparative Example 1

Except for that as the negative electrode, stainless steel foil M2 was only used, in a manner similar to that of Example 1, a half cell was formed and then evaluated. The results are shown in Table 1.

TABLE 1

| | PROJECTION PORTION | CHARGE/ DISCHARGE EFFICIENCY AT FIRST CYCLE (%) | MAXIMUM CHARGE/ DISCHARGE EFFICIENCY (%) |
|---|---|---|---|
| EXAMPLE 1 | YES (LINE SHAPE) | 96.1 | 98.0 |
| EXAMPLE 2 | YES (POLYGONAL SHAPE) | 95.8 | 98.0 |
| COMPARATIVE EXAMPLE 1 | NO | 94.8 | 97.8 |

As apparent from Table 1, in Examples 1 and 2 in each of which the negative electrode including the projection portions were used, regardless of the shape of the projection portion, the charge/discharge efficiency at a first cycle and the maximum charge/discharge efficiency were both improved as compared to those of Comparative Example 1.

Hereinafter, the influence of the minimum distance D between the projection portions on the charge/discharge efficiency was confirmed.

Example 3

Except for that three line-shaped projection portions arranged as shown in FIG. 2 were integrally formed together with a base portion by etching of copper foil (thickness: 100 μm, manufactured by Hirai Seimitsu Kogyo Corporation), a negative electrode and a half cell were formed in a manner similar to that of Example 1 and were then evaluated. The results are shown in Table 2. The diameter of the top portion of the projection portion was 70 μm, the height thereof was 30 μm, and the minimum distance D between the projection portions was approximately 5 mm. The area of the base portion was 95% of the area of the facing surface, and the entire area of the base portion of the negative electrode collector was an open region. The maximum height roughness Rz of the base portion was 2 μm.

Example 4

Except for that five line-shaped projection portions were formed so that the minimum distance D therebetween was approximately 3 mm, a negative electrode and a half cell were formed in a manner similar to that of Example 3 and were then evaluated. The results are shown in Table 2. The area of the base portion was 91% of the area of the facing surface, and the entire area of the base portion of the negative electrode collector was an open region. The maximum height roughness Rz of the base portion was 2 μm.

Example 5

Except for that 15 line-shaped projection portions were formed so that the minimum distance D therebetween was approximately 1 mm, a negative electrode and a half cell were formed in a manner similar to that of Example 3 and were then evaluated. The results are shown in Table 2. The area of the base portion was 70% of the area of the facing surface, and the entire area of the base portion of the negative electrode collector was an open region. The maximum height roughness Rz of the base portion was 2 μm.

Example 6

Except for that 88 line-shaped projection portions were formed so that the minimum distance D therebetween was approximately 0.1 mm, a negative electrode and a half cell were formed in a manner similar to that of Example 3 and were then evaluated. The results are shown in Table 2. The area of the base portion was 30% of the area of the facing surface, and the entire area of the base portion of the negative electrode collector was an open region. The maximum height roughness Rz of the base portion was 2 μm.

Comparative Example 2

Except for that no etching was performed on copper foil, a negative electrode and a half cell were formed in a manner similar to that of Example 3 and were then evaluated. The results are shown in Table 2.

TABLE 2

| | MINIMUM DISTANCE D (mm) | CHARGE/ DISCHARGE EFFICIENCY AT FIRST CYCLE (%) | MAXIMUM CHARGE/ DISCHARGE EFFICIENCY (%) |
|---|---|---|---|
| EXAMPLE 3 | 5 | 95.2 | 98.3 |
| EXAMPLE 4 | 3 | 95.4 | 98.4 |
| EXAMPLE 5 | 1 | 95.9 | 98.3 |
| EXAMPLE 6 | 0.1 | 95.6 | 98.0 |
| COMPARATIVE EXAMPLE 2 | — | 95.0 | 98.3 |

As apparent from Table 2, in Examples 3 to 6 in which the minimum distance D was in a range of 0.1 to 5 mm, the charge/discharge efficiency at a first cycle was improved as compared to that of Comparative Example 2.

Hereinafter, the charge/discharge efficiency was evaluated when the projection portion had an insulating property.

Example 7

As shown in FIG. 7, polyimide tapes (manufactured by Nitto Denko Corporation) were each adhered to one primary surface of stainless steel foil having a diameter of 15 mm and a thickness of 300 μm (maximum height roughness Rz: approximately 10 μm, manufactured by Hirai Seimitsu Kogyo Corporation), so that a negative electrode including line-shaped projection portions was obtained. Except for that this negative electrode was used, a half cell was formed in a manner similar to that of Example 1 and was then evaluated. The results are shown in Table 3. The length of the projection portion in a short-side direction was 1 mm, and the height thereof was 60 μm. The area of the base portion was 77% of the area of the facing surface, and the entire area of the base portion of the negative electrode collector was an open region. The minimum distance D between the projection portions was approximately 7 mm.

Example 8

Except for that polyimide tapes were each adhered as shown in FIG. 8, a negative electrode and a half cell were formed in a manner similar to that of Example 7 and were then evaluated. The results are shown in Table 3. The projection portions each had a regular tetragonal shape having a side length of 2 mm, and the height thereof was 60 μm. The minimum distance D between the projection portions was approximately 6 mm.

TABLE 3

| | PROJECTION PORTION | CHARGE/ DISCHARGE EFFICIENCY AT FIRST CYCLE (%) | MAXIMUM CHARGE/ DISCHARGE EFFICIENCY (%) |
|---|---|---|---|
| EXAMPLE 7 | YES (LINE SHAPE) | 95.4 | 98.3 |
| EXAMPLE 8 | YES (POLYGONAL SHAPE) | 95.4 | 98.5 |
| COMPARATIVE EXAMPLE 1 | NO | 94.8 | 97.8 |

As apparent from Table 3, even when the projection portion had an insulating property, the charge/discharge efficiency at a first cycle and the maximum charge/discharge efficiency were both improved as compared to those of Comparative Example 1.

Hereinafter, it was confirmed whether a lithium metal to be deposited was received in the space formed between the base portion and the separator or not.

Example 9

Except for that three line-shaped projection portions as shown in FIG. 2 were integrally formed together with a base portion by etching of copper foil (thickness: 100 μm, manufactured by Hirai Seimitsu Kogyo Corporation), four negative electrodes Na to Nd and four half cells Ca to Cd were formed in a manner similar to that of Example 1. The width (diameter) of the top portion of each projection portion was 70 μm, and the height thereof was 30 μm. The minimum distance D between the projection portions was approximately 5 mm, the area of the base portion was 95% of the area of the facing surface, and the entire area of the base portion of the negative electrode collector was an open region. The maximum height roughness Rz of the base portion was 2 μm.

Figure 10:
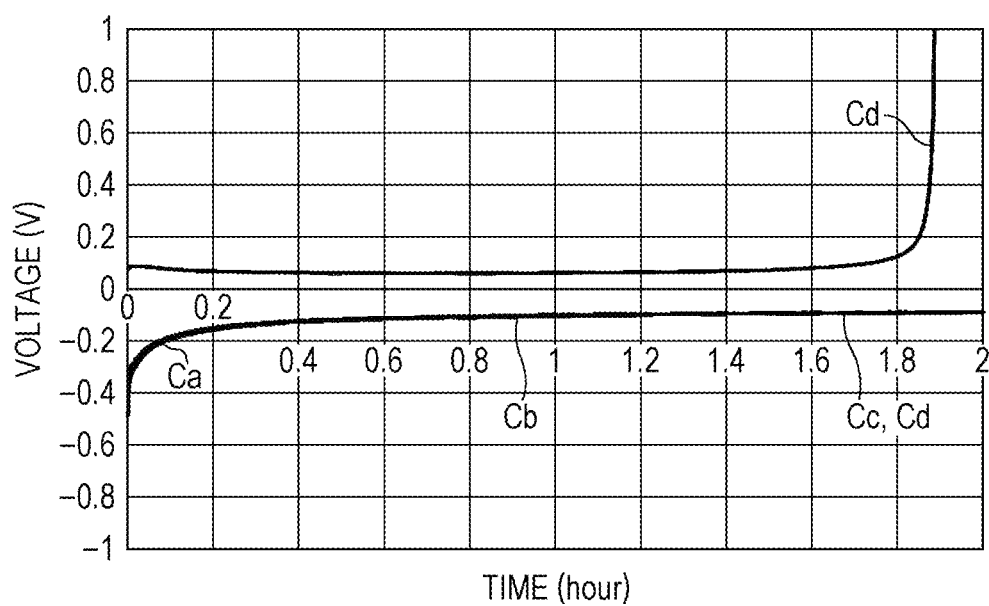
FIG. 10 is a graph showing a charge curve and a discharge curve of Example 9.

Each half cell was charged at a current density of 3.75 mA/cm$^2$, and a lithium metal was deposited so that the negative electrode Na had a electrical capacity of 1.5 mAh/cm$^2$ (charge time: 0.4 hours), the negative electrode Nb had a electrical capacity of 4.5 mAh/cm$^2$ (charge time: 1.2 hours), and the negative electrodes Nc and Nd each had a electrical capacity of 7.5 mAh/cm$^2$ (charge time: 2 hours). The half cell Cd which was charged for 2 hours was discharged at the same current density for 2 hours, so that the lithium metal thus deposited was dissolved. In FIG. 10, the charge curve and the discharge curve of each half cell are shown. It is found that the half cells were each stably charged and/or discharged.

Figure 11A:
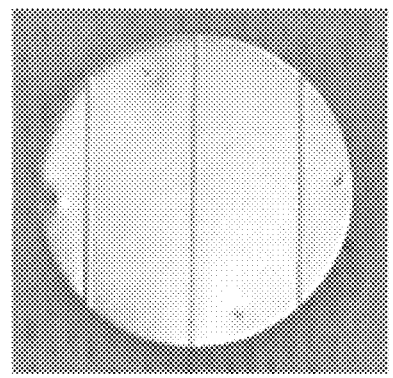
FIG. 11A is a view showing an image of a negative electrode formed in Example 9 taken along the normal line direction of a facing surface.
Figure 11B:
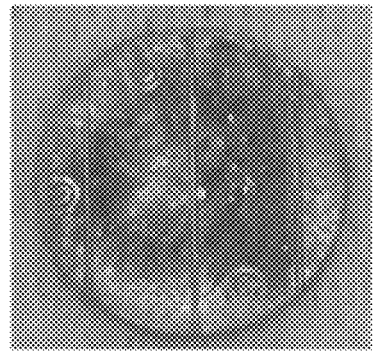
FIG. 11B is a view showing an image of a charged negative electrode formed in Example 9 taken along the normal line direction of the facing surface.

After the charge and/or the discharge was completed, the half cells were each disassembled, and the negative electrodes were recovered. In FIGS. 11B to 11E, images of the recovered negative electrodes Na to Nd each taken along the normal line direction of the facing surface (surface facing the counter electrode) are shown. FIG. 11B corresponds to the charged negative electrode Na, and FIG. 11C corresponds to the charged negative electrode Nb. FIG. 11D corresponds to the charged negative electrode Nc, and FIG. 11E corresponds to the discharged negative electrode Nd. In addition, FIG. 11A is an image of the negative electrode Na before charged.

On the base portions of the negative electrodes Na and Nb at which lithium metals were deposited to have an electrical capacity of 1.5 mAh/cm$^2$ and 4.5 mAh/cm$^2$, respectively, the copper foil was observed, and a region not covered with the lithium metal was present. On the other hand, on the base portion of the negative electrode Nc at which a lithium metal was deposited to have an electrical capacity of 7.5 mAh/cm$^2$, no copper foil was observed, and the base portion was fully covered with the lithium metal. However, in every negative electrode, the periphery of the projection portion was apparently observed. That is, it is found that although slightly covering the projection portion, the lithium metal thus deposited was received in the space formed between the base portion of the negative electrode collector and the separator.

Figure 11C:
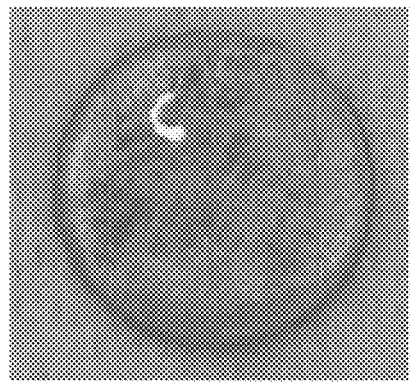
FIG. 11C is a view showing an image of another charged negative electrode formed in Example 9 taken along the normal line direction of a facing surface.
Figure 11D:
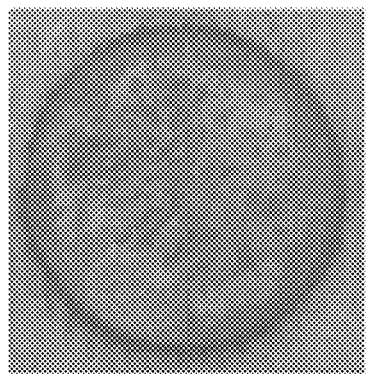
FIG. 11D is a view showing an image of still another charged negative electrode formed in Example 9 taken along the normal line direction of a facing surface.
Figure 11E:
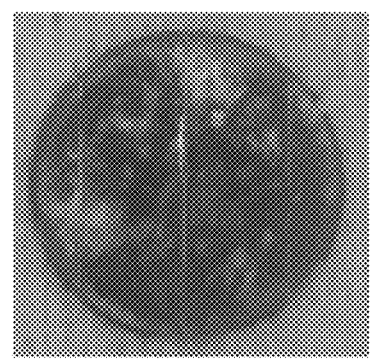
FIG. 11E is a view showing an image of still another discharged negative electrode formed in Example 9 taken along the normal line direction of a facing surface.

In addition, as apparent from FIGS. 11B, 11C, and 11D, as the amount of the lithium metal thus deposited was increased, the deposited lithium metal showed a silver-gray color. This color indicates that the surface of the deposited lithium metal facing the separator is smooth. That is, the color indicates that the lithium metal is uniformly deposited on the negative electrode collector having a smooth base portion, and most of the lithium metal was brought into contact with the separator and pressed thereto. Hence, during discharge, the lithium metal thus deposited was likely to be dissolved, and hence, the charge/discharge efficiency was increased.

Hereinafter, negative electrode collectors were formed using various porous metal sheets each having a non-smooth facing surface, and the charge/discharge efficiency was measured. As a result, it was confirmed that by the use of any of the above porous metal sheets, the charge/discharge efficiency was decreased.

Comparative Examples 3 to 6

Except for that a negative electrode formed by resistance-welding of one of porous metal sheets (each manufactured by Taiyo Wire Cloth Co., Ltd.) shown in Table 4 to stainless foil was used, an electrolyte solution containing LiPF$_6$/EC/DMC/EMC=1/5/2.5/2.5 (molar ratio) was used, and a separator formed of a polyolefin-made porous film was used, a half cell was formed in a manner similar to that of Example 1 and was then evaluated. In addition, EC and EMC were manufactured by Mitsubishi Chemical Corporation. The results are shown in Table 4. In addition, the maximum height roughness Rz of each facing surface was more than 10 μm. As the porous metal sheet, in Comparative Example 3, a 30 μm-thick felt formed from fine stainless steel fibers was used; in Comparative Example 4, a 100 μm-thick felt formed from fine stainless steel fibers was used; in Comparative Example 5, 100 μm-thick rolled and foamed stainless steel was used; and in Comparative Example 6, 635 mesh stainless steel having a thickness of 80 μm was used. In Table 4, the porosity or the aperture ratio of each porous metal sheet is also shown.

Comparative Example 7

Except for that stainless steel foil M2 was only used as the negative electrode, a half cell was formed in a manner similar to that of Comparative Example 3 and was then evaluated. The results are shown in Table 4.

TABLE 4

|  | POROSITY/APERTURE RATIO (%) | MAXIMUM CHARGE/DISCHARGE EFFICIENCY (%) |
| --- | --- | --- |
| COMPARATIVE EXAMPLE 3 | 63 | 92.5 |
| COMPARATIVE EXAMPLE 4 | 89 | 93.3 |
| COMPARATIVE EXAMPLE 5 | 50 | 92.9 |
| COMPARATIVE EXAMPLE 6 | 25 | 92.3 |
| COMPARATIVE EXAMPLE 7 | 0 | 94.7 |

As apparent from Table 4, compared to Comparative Example 7 in which the stainless steel foil was only used as the negative electrode, in Comparative Examples 3 to 6 in each of which the porous metal sheet was used, the maximum charge/discharge efficiency was decreased. The reason for this is believed that a lithium metal deposited in pores of the porous metal sheet was not able to be dissolved during discharge. However, the maximum charge/discharge efficiency of Comparative Example 7 was also not sufficient.

Example 10

By the use of a positive electrode formed as described below and the negative electrode formed in Example 8, a coin-type lithium secondary battery was formed.
(1) Formation of Positive Electrode
LiNi$_{0.8}$Co$_{0.18}$Al$_{0.02}$O$_2$ (positive electrode active material (NCA)), acetylene black (AB), and a poly(vinylidene fluoride) (PVDF) were dispersed in N-methyl-2-pyrrolidone to satisfy NCA/AB/PVDF=98/1/1 (weight ratio), so that a slurry was obtained. After the slurry thus obtained was applied to one surface of aluminum foil (positive electrode collector), drying was performed at 105° C., so that a positive electrode mixture layer was formed. Subsequently, a laminate of the aluminum foil and the positive electrode mixture layer thus obtained was rolled and then punched out to have a disc shape having a diameter of 15 mm, so that a positive electrode was obtained. The positive electrode was formed to have an electrical capacity of 4.5 mAh/cm$^2$.
(2) Formation of Coin-Type Lithium Secondary Battery
As described below, a coin-type lithium secondary battery (diameter: 20 mm, thickness: 1.6 mm) as shown in FIG. 1 was assembled. In addition, the assembly of the coin-type lithium secondary battery was performed in dry air at a dew point of approximately −60° C.
Stainless steel foil (spacer) having a diameter of 16 mm and a thickness of 300 μm was resistance-welded to a positive electrode case. After the positive electrode formed in the above (1) was disposed on the spacer so that the positive electrode collector faced the spacer, 40 μL of an electrolyte solution containing LiPF$_6$/FEC/DMC=1/5/5 (molar ratio) was dripped. A separator (polyimide-made three-dimensional regular array porous film, diameter: 17.6 mm) was disposed on the positive electrode, and 40 μL of the above electrolyte solution was further dripped. After the negative electrode was disposed on the above film, a disc spring (made of stainless steel) and a negative electrode case (made of stainless steel) were placed. Finally, the negative electrode case was swaged over the positive electrode case with a gasket interposed therebetween for sealing, so that a coin-type lithium secondary battery was obtained.
[Evaluation 2]
A charge/discharge cycle was repeatedly performed 10 times on the coin-type lithium secondary battery, and the thickness of the battery was measured after the tenth charge was finished.
The charge/discharge was performed at 25° C., at a current density of 0.9 mA/cm$^2$, and in a voltage range of 2.5 to 4.3 V. The current density was calculated based on the area (1.77 cm$^2$) of the negative electrode obtained when the negative electrode was viewed along the normal line direction of the primary surface of the negative electrode collector.

Comparative Example 8

Except for that stainless steel foil M2 was only used as the negative electrode, a coin-type lithium secondary battery as shown in FIG. 1 was formed and then evaluated in a manner similar to that of Example 10.
The thickness of the coin-type lithium secondary battery of Example 10 was increased by 4 μm. On the other hand, in Comparative Example 8, the thickness was increased by 37 μm. When discharge was performed after the tenth charge was performed, the discharge capacities were each 4 mAh/cm$^2$. From the results thus obtained, it is found that when the projection portions are provided on the negative electrode collector, the change in volume of the battery after the charge/discharge cycles can be suppressed. Furthermore, even when a polyimide, which is an insulating material, is used as the projection portion, it is also found that the battery capacity is maintained.

Comparative Examples 9 and 10

Figure 12:
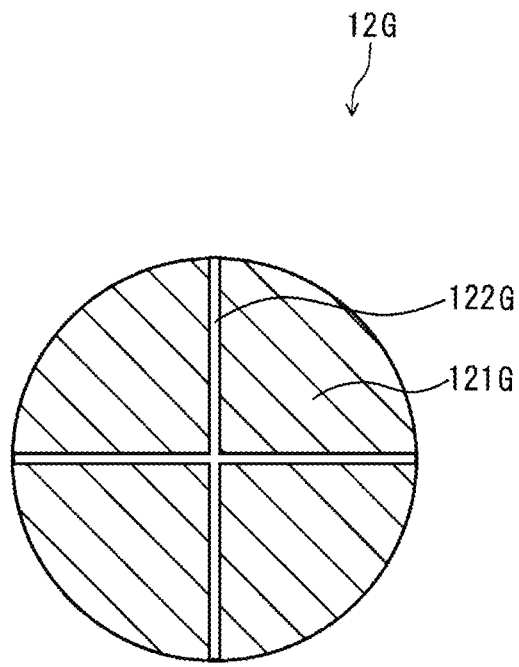
FIG. 12 is a top view schematically showing a negative electrode according to a Comparative Example 9.
Figure 13:
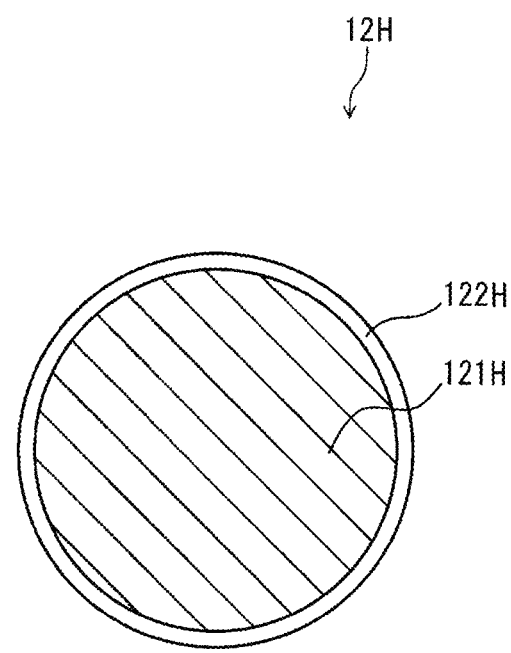
FIG. 13 is a top view schematically showing a negative electrode according to Comparative Example 10.

Except for that a cross-shape projection portion as shown in FIG. 12 was formed by etching of stainless steel foil M1 punched out to have a diameter of 15 mm, a negative electrode and a half cell of Comparative Example 9 were formed in a manner similar to that of Example 1. FIG. 12 schematically shows a negative electrode 12G formed of a negative electrode collector 121G having a cross-shape projection portion 122G.
Except for that a ring-shape projection portion as shown in FIG. 13 was formed from stainless steel foil M1 punched out to have a diameter of 15 mm along the periphery thereof by etching, a negative electrode and a half cell of Comparative Example 10 were formed in a manner similar to that of Example 1. FIG. 13 schematically shows a negative electrode 12H formed of a negative electrode collector 121H having a ring-shape projection portion 122H.
In the negative electrodes of Comparative Examples 9 and 10, the width of the top portion of the projection portion was 70 μm, and the height of the projection portion was 30 μm.

The results of the evaluation of the half cells of Comparative Examples 9 and 10 are shown in Table 5 together with the results of Example 1.

TABLE 5

| | PROJECTION PORTION | CHARGE/ DISCHARGE EFFICIENCY AT FIRST CYCLE (%) | MAXIMUM CHARGE/ DISCHARGE EFFICIENCY (%) |
|---|---|---|---|
| EXAMPLE 1 | YES (LINE SHAPE) | 96.1 | 98.0 |
| COMPARATIVE EXAMPLE 9 | YES (CROSS SHAPE) | 94.2 | 97.5 |
| COMPARATIVE EXAMPLE 10 | YES(RING SHAPE) | 94.3 | 97.1 |

In Example 1, on the surface of the stainless steel foil M1, there is provided a flow path through which the electrolyte solution flows from one end to the other end without being disturbed by the projection portions. On the other hand, in Comparative Examples 9 and 10, since the flow of the electrolyte solution is disturbed by the projection portion, the flow path as described above is not present. As apparent from Table 5, compared to Comparative Examples 9 and 10, in Example 1, the charge/discharge efficiency at a first cycle and the maximum charge/discharge efficiency were both superior. The reason for this is believed that the flow path in Example 1 promotes the flow of the electrolyte solution and sufficiently diffuses lithium ions on the surface of the negative electrode. Accordingly, in Example 1, while the change in volume caused by deposition and dissolution of a lithium metal is suppressed, the cycle life can be improved.

Examples 12 to 16

Except for that the heights of the projection portions are changed from each other, negative electrodes and half cells of Examples 12 to 16 were formed in a manner similar to that of Example 1. The heights of the projection portions of Examples 12 to 16 were 10, 15, 90, 120, and 150 µm, respectively. The results of evaluation of the half cells of Examples 12 to 16 are shown in Table 6 together with the results of Example 1 and Comparative Example 1.

TABLE 6

| | HEIGHT OF PROJECTION PORTION (µm) | CHARGE/ DISCHARGE EFFICIENCY AT FIRST CYCLE (%) | MAXIMUM CHARGE/ DISCHARGE EFFICIENCY (%) |
|---|---|---|---|
| EXAMPLE 1 | 30 | 96.1 | 98.0 |
| EXAMPLE 12 | 10 | 95.2 | 97.7 |
| EXAMPLE 13 | 15 | 95.6 | 98.3 |
| EXAMPLE 14 | 90 | 96.6 | 98.2 |
| EXAMPLE 15 | 120 | 96.1 | 98.4 |
| EXAMPLE 16 | 150 | 95.3 | 96.5 |
| COMPARATIVE EXAMPLE 1 | — | 94.8 | 97.8 |

As apparent from Table 6, in Examples 1 and 12 to 16 in which the height of the projection portion is 10 to 150 µm, the charge/discharge efficiency at a first cycle was higher than that of Comparative Example 1. Furthermore, in Examples 1 and 13 to 15 in which the height of the projection portion is 15 to 120 µm, the charge/discharge efficiency at a first cycle and the maximum charge/discharge efficiency were both higher than those of Comparative Example 1.

Overview of Embodiments

A lithium secondary battery according to one aspect of the present disclosure comprises: a positive electrode including a positive electrode active material which contains lithium; a negative electrode including a negative electrode collector which has a surface on which a lithium metal is deposited in a charged state; a separator disposed between the positive electrode and the negative electrode; and a nonaqueous electrolyte solution which is filled between the positive electrode and the negative electrode and which has a lithium ion conductivity. The negative electrode collector includes a plurality of projection portions projecting from the surface thereof to the separator. There is no projection portion on an imaginary line extending from a first end to a second end opposite to the first end of the surface of the negative electrode collector and traversing a space between the projection portions.

Although being represented by the line F in each of FIGS. 2, 4A to 4C, 5, 6A, 6B, 7, and 8. The "imaginary line" described above is not limited thereto.

The projection portions may be in direct contact with the separator. The lithium metal may be deposited in a space between the separator and the region of the negative electrode collector.

The negative electrode may allow the nonaqueous electrolyte solution to flow between the separator and the surface of the negative electrode collector along the imaginary line.

For example, the projection portions each have a strip shape when being viewed in a direction perpendicular to the surface of the negative electrode collector. Although being shown, for example, in FIGS. 2, and 4A to 4C, the projection portion having a strip shape is not limited thereto. The minimum value of the distance between adjacent projection portions among the projection portions may be larger than the width of the strip shape in a short-side direction of each of the projection portions. The imaginary line may also be in parallel to a long-side direction of the strip shape.

For example, the projection portions each have a taper shape along a cross-section of the strip shape perpendicular to a long-side direction thereof. Although being shown in FIG. 3 by way of example, the taper-shape projection portion is not limited thereto.

For example, the projection portions are arranged in a stripe form when being viewed in the direction perpendicular to the surface of the negative electrode collector. Although being shown in FIGS. 2, 4A, and 4B by way of example, the projection portions arranged in a stripe form are not limited thereto.

For example, the projection portions are arranged in a two-dimensional manner when being viewed in the direction perpendicular to the surface of the negative electrode collector. Although being shown in FIG. 4C by way of example, the projection portions arranged in a two-dimensional manner are not limited thereto.

For example, the minimum value of the distance between adjacent projection portions among the projection portions may be larger than the maximum width of each of the projection portions when the projection portions are viewed in a direction perpendicular to the surface of the negative electrode collector. The projection portions may be arranged in a two-dimensional manner on the surface of the negative electrode collector. The arrangement of the projection portions may have a first periodicity in a first direction and may also have a second periodicity in a second direction different from the first direction. Among the projection portions, a first distance between adjacent projection portions arranged in the first direction may be equal to a second distance between adjacent projection portions arranged in the second direction. Although being shown in FIGS. 5, 6A, 6B, and 8 by way of example, the structure as described above is not limited thereto. Furthermore, the first direction may also be perpendicular to the second direction. Although being shown in FIGS. 5, 6A, and 8 by way of example, the structure as described above is not limited thereto. Alternatively, the first direction may also be not perpendicular to the second direction. Although being shown in FIG. 6B by way of example, the structure as described above is not limited thereto.

For example, the projection portions each may have one of a round shape, an oval shape, and a polygonal shape when being viewed in the direction perpendicular to the surface of the negative electrode collector.

For example, the negative electrode collector may comprise: an electrically conductive sheet; and a plurality of electrically conductive members arranged thereon as the projection portions.

For example, a material of the electrically conductive members may be different from a material of the electrically conductive sheet.

For example, the negative electrode collector may comprise: an electrically conductive sheet; and a plurality of insulating members arranged thereon as the projection portions.

For example, the negative electrode collector may contain copper.

For example, the rate of the total area of the projection portions to the area of the negative electrode collector may be 0.2% to 70% when the projection portions are viewed in a direction perpendicular to the surface of the negative electrode collector.

For example, the separator may partially intrude into a space between the projection portions.

For example, the height of each of the projection portions may be 15 to 120 μm.

For example, the minimum value of the distance between two adjacent projection portions among the projection portions may be smaller than the length of the surface of the negative electrode collector in a short-side direction.

For example, the electrolyte solution may be held by a polymer compound in a gel electrolyte filled between the positive electrode and the negative electrode. As an example of the polymer compound, for example, there may be mentioned a fluorine-containing resin including a vinylidene fluoride unit, an acrylic resin including a (meth)acrylic acid and/or a (meth)acrylic acid ester unit, or a polyether resin including a poly(alkylene oxide) unit.

What is claimed is:

1. A lithium secondary battery comprising:
   a positive electrode including a positive electrode active material containing lithium;
   a negative electrode including a negative electrode collector having a surface, wherein the negative electrode includes a lithium metal in a charged state;
   a separator disposed between the positive electrode and the negative electrode; and
   a nonaqueous electrolyte solution filled between the positive electrode and the negative electrode, the nonaqueous electrolyte solution having a lithium ion conductivity,
   wherein the negative electrode collector includes projection portions projecting from the surface toward the separator, and
   there is no projection portion on an imaginary line extending from a first end to a second end opposite to the first end of the surface of the negative electrode collector and traversing a space between the projection portions,
   wherein the negative electrode collector includes: an electrically conductive sheet having a smooth base portion; and each of the projection portions being an insulator and being in direct contact with the smooth base portion of the electrically conductive sheet.

2. The lithium secondary battery according to claim 1, wherein the projection portions are in direct contact with the separator while securing the space, in which the lithium metal is deposited in the charged state.

3. The lithium secondary battery according to claim 1, wherein the negative electrode allows the nonaqueous electrolyte solution to communicate between the separator and the surface of the negative electrode collector along the imaginary line.

4. The lithium secondary battery according to claim 1, wherein the projection portions each have a strip shape when being viewed in a direction perpendicular to the surface of the negative electrode collector.

5. The lithium secondary battery according to claim 4, wherein a distance between each adjacent two of the projection portions is larger than a width of the strip shape in a short-side direction of each of the projection portions.

6. The lithium secondary battery according to claim 4, wherein the imaginary line is in parallel to a long-side direction of the strip shape.

7. The lithium secondary battery according to claim 4, wherein the projection portions each have a taper shape in a cross-section of the strip shape perpendicular to a long-side direction thereof.

8. The lithium secondary battery according to claim 4, wherein the projection portions are arranged in a stripe form when being viewed in the direction perpendicular to the surface of the negative electrode collector.

9. The lithium secondary battery according to claim 4, wherein the projection portions are arranged in a two-dimensional manner when being viewed in the direction perpendicular to the surface of the negative electrode collector.

10. The lithium secondary battery according to claim 1, wherein a distance between each adjacent two of the projection portions is larger than a maximum width of each of the projection portions when the projection portions are viewed in a direction perpendicular to the surface of the negative electrode collector.

11. The lithium secondary battery according to claim 10, wherein the projection portions are arranged in a two-dimensional manner on the surface of the negative electrode collector.

12. The lithium secondary battery according to claim 11, wherein an arrangement of the projection portions has a first periodicity in a first direction and a second periodicity in a second direction which is different from the first direction.

13. The lithium secondary battery according to claim 12, wherein a first distance between adjacent two of the projection portions in the first direction is equal to a second distance between adjacent two of the projection portions in the second direction.

14. The lithium secondary battery according to claim 12, wherein the first direction is perpendicular to the second direction.

15. The lithium secondary battery according to claim 12, wherein the first direction is not perpendicular to the second direction.

16. The lithium secondary battery according to claim 10, wherein the projection portions each have a round shape, an oval shape, or a polygonal shape when being viewed in the direction perpendicular to the surface of the negative electrode collector.

17. The lithium secondary battery according to claim 10, wherein the negative electrode collector includes:
    an electrically conductive sheet; and
    electrically conductive members disposed on the electrically conductive sheet as the projection portions.

18. The lithium secondary battery according to claim 17, wherein a material of the electrically conductive members is different from a material of the electrically conductive sheet.

19. The lithium secondary battery according to claim 10, wherein the negative electrode collector includes:
    an electrically conductive sheet; and
    insulating members disposed on the electrically conductive sheet as the projection portions.

20. The lithium secondary battery according to claim 1, wherein the negative electrode collector contains copper.

21. The lithium secondary battery according to claim 1, wherein a rate of a total area of the projection portions to an area of the negative electrode collector is 0.2% to 70% when the projection portions are viewed in a direction perpendicular to the surface of the negative electrode collector.

22. The lithium secondary battery according to claim 1, wherein the height of each of the projection portions is 15 to 120 µm.

23. The lithium secondary battery according to claim 1, wherein a distance between each two adjacent of the projection portions is smaller than a length of the surface of the negative electrode collector in a short-side direction.

24. The lithium secondary battery according to claim 1, wherein the lithium metal is deposited on the surface of the negative electrode collector in accordance with charge of the lithium secondary battery, and
the lithium metal is dissolved from on the surface into a electrolyte solution in accordance with discharge of the lithium secondary battery.

25. The lithium secondary battery according to claim 1, wherein the each of the projection portions includes a flat top portion and two side tapered portions.

* * * * *